US012789363B2

(12) United States Patent
Qian et al.

(10) Patent No.: US 12,789,363 B2
(45) Date of Patent: Nov. 10, 2026

(54) SOFT MUSCLE, TRANSMISSION STRUCTURE, ROBOT, METHOD OF MANUFACTURING SOFT MUSCLE AND METHOD OF DESIGNING MANIPULATOR

(71) Applicant: WISSON TECHNOLOGY (SHENZHEN) LIMITED, Guangdong (CN)

(72) Inventors: Zhongfeng Qian, Guangdong (CN); Xiulin Chen, Guangdong (CN); Beineng Liu, Guangdong (CN)

(73) Assignee: WISSON TECHNOLOGY (SHENZHEN) LIMITED, Guangdong (CN)

( * ) Notice: Subject to any disclaimer, the term of this patent is extended or adjusted under 35 U.S.C. 154(b) by 0 days.

(21) Appl. No.: 19/120,494

(22) PCT Filed: Oct. 12, 2023

(86) PCT No.: PCT/CN2023/124242
§ 371 (c)(1),
(2) Date: Apr. 11, 2025

(87) PCT Pub. No.: WO2024/078577
PCT Pub. Date: Apr. 18, 2024

(65) Prior Publication Data

US 2026/0109026 A1 Apr. 23, 2026

(30) Foreign Application Priority Data

Oct. 12, 2022 (CN) ........................ 202211247317.6

(51) Int. Cl.
*B25J 9/10* (2006.01)
*B25J 19/00* (2006.01)

(52) U.S. Cl.
CPC ........... *B25J 9/1075* (2013.01); *B25J 19/007* (2013.01)

(58) Field of Classification Search
CPC ...... B25J 9/1075; B25J 19/007; B25J 9/0006; B25J 9/142; B25J 15/0023; B25J 18/06; B29C 39/02
See application file for complete search history.

(56) References Cited

U.S. PATENT DOCUMENTS 3,469,502 A * 9/1969 Gardner .................. F16J 3/047 407/120
5,181,452 A * 1/1993 Immega .................. B25J 18/06 92/92
(Continued)

FOREIGN PATENT DOCUMENTS

CN 105506757 A 4/2016
CN 108724166 A 11/2018
(Continued)

OTHER PUBLICATIONS

International Search Report and Written Opinion for International Application No. PCT/CN2023/124242, International filing date Oct. 12, 2023, 12 pages.

*Primary Examiner* — Zakaria Elahmadi
(74) *Attorney, Agent, or Firm* — KDW Firm PLLC

(57) ABSTRACT

A soft muscle, a transmission structure, a robot, a manufacturing method for the soft muscle, and a design method for a mechanical arm. The soft muscle comprises two end surfaces, a flexible side wall and a driving source interface. The flexible side wall and the end surfaces enclose a chamber. The flexible side wall comprises a multi-layer stacked structure having uniformly-distributed strain. The stacked structure is provided with folding surfaces. Crease surfaces are formed at joint portions of the folding surfaces of adjacent layers. Combination of the shape, the thickness
(Continued)

and the stacking mode of strain units enables strain to be uniformly distributed on the folding surfaces rather than concentrating at crease portions, and, during the compression or extension process of the stacked structure, the invasion angle θ changes, and the creases only move along the axis along with the crease surfaces and do not deform.

18 Claims, 12 Drawing Sheets

(56) References Cited

U.S. PATENT DOCUMENTS

| | | | | |
|---|---|---|---|---|
| 12,521,897 | B2 * | 1/2026 | Li | B25J 9/08 |
| 2003/0218403 | A1 | 11/2003 | Dubowsky | |
| 2011/0224792 | A1 | 9/2011 | Groeger | |
| 2020/0130175 | A1 * | 4/2020 | Li | F16J 3/00 |

FOREIGN PATENT DOCUMENTS

| | | | | | |
|---|---|---|---|---|---|
| CN | 109129456 | A | | 1/2019 | |
| CN | 110394795 | A | | 11/2019 | |
| CN | 110802575 | A | | 2/2020 | |
| CN | 113071124 | A | | 7/2021 | |
| CN | 114367966 | A | | 4/2022 | |
| CN | 114700935 | A | * | 7/2022 | B25J 9/142 |
| CN | 217513879 | U | * | 9/2022 | |
| JP | 3179088 | U | | 9/2012 | |
| JP | 2020186801 | A | | 11/2020 | |

* cited by examiner

SOFT MUSCLE, TRANSMISSION STRUCTURE, ROBOT, METHOD OF MANUFACTURING SOFT MUSCLE AND METHOD OF DESIGNING MANIPULATOR

CROSS-REFERENCE TO RELATED APPLICATIONS

The present application is a national stage filing under 35 U.S.C. 371 of pending International Application No. PCT/CN2023/124242, filed Oct. 12, 2023, which application is based on and claims priority to the application with CN application No. 202211247317.6 filed on Oct. 12, 2022, the disclosure of each application is hereby incorporated herein by reference in its entirety.

TECHNICAL FIELD

This disclosure relates to the field of robot, in particular a soft muscle, transmission structures, a robot, a method of producing a soft muscle and a method of designing a manipulator.

BACKGROUND ART

At present, the majority of robots and manipulators that can be put into use in industrialized mass production are rigid structures.

Academia and a few companies have some research and progress in basic research on flexible manipulators and robots, the core composition of flexible manipulators and robots is a flexible actuator. There are many ways of flexible actuation, which may include for example: using elastic components in whole or in part: using rope and other flexible parts for transmission; utilizing the deformation of materials with special electromagnetic properties in an electric or magnetic field: utilizing the deformation of materials sensitive to light or temperature under different light or temperature conditions: changing the characteristics such as the temperature and volume of the contents through chemical reactions in a closed cavity to produce deformation. Among them, mechanical energy fluid actuation is a relatively mature technical direction.

It should be noted that the statements in this background art portion only provide the disclosure related background art, and may not necessarily constitute prior art.

CONTENTS OF THE INVENTION

This disclosure provides a soft muscle, transmission structures, a robot, a method of producing a soft muscle and a method of designing a manipulator, so as to improve the energy transfer efficiency of the soft muscle.

The first aspect of this disclosure provides a soft muscle, comprising two end faces, a flexible sidewall and a drive source port, the flexible sidewall and the two end faces enclosing to form a cylindrical cavity having a central axis, the flexible sidewall being designed to or comprising a strain uniformly-distributed stacking structure, which is formed by stacking strain uniformly-distributed stacking layers of identical shapes so that the strain of the entire sidewall is distributed uniformly across the strain uniformly-distributed stacking layers, the strain uniformly-distributed stacking layers comprising at least one strain unit with a folding face and a crease, based on a combination of the shape, thickness and stacking manner of the strain units, the strain of the individual strain unit being uniformly distributed on the folding face instead of being concentrated at the crease, the drive source port being provided on the flexible sidewall or on the end face and being used to change the differential pressure between inside and outside of the cavity and to cause the strain uniformly-distributed stacking structure to compress or extend to drive the end face of the soft muscle to move, The strain uniformly-distributed stacking layer is enclosed by a single or a plurality of folding faces, at the joint of the folding faces of two adjacent layers of the strain uniformly-distributed stacking structure, a crease plane with at least one crease is formed, wherein the soft muscle has an intrusion angle θ, an intrusion depth factor a and a wall thickness t, the intrusion angle θ is the angle between two adjacent layers of the folding faces and the crease plane, the intrusion angle θ varies with the compression or extension of the strain uniformly-distributed stacking structure, and a difference between distances from a convex crease and a concave crease on a strain unit to a central axis is defined as degree of depression, the intrusion depth factor a is the proportion of the degree of depression to the overall size of the convex crease, and the wall thickness t is a thickness of the flexible sidewall, The intrusion angle θ, the intrusion depth factor a and the wall thickness t are numerically related to each other and have predefined combinations of values, such that during the deformation of the soft muscle, only folding or unfolding of the strain uniformly-distributed stacking structure occurs on the flexible sidewall, and the strain of the flexible sidewall is uniformly distributed on each of the folding faces instead of being concentrated at the creases.

The folding faces and creases have one or two basic shapes that are repeated or gradually change in proportion. The basic shapes are circumferentially distributed about the central axis to form a layer of the strain uniformly-distributed stacking layers, and the strain uniformly-distributed stacking layers extend along the central axis to form the strain uniformly-distributed stacking structure which is repetitively stacked in the axial direction. At the joint of the folding faces of two adjacent layers of the strain uniformly-distributed stacking layers, a crease plane is formed, which has creases having the contour in a form of a closed curve or a polygon. The creases on the spaced crease planes in the direction of the central axis have the same shape and the same position with respect to the central axis. The creases on the spaced crease planes and the creases on the adjacent crease planes have different concave and convex states on the flexible sidewall. The soft muscle has an initial intrusion angle θp in an initial state which varies from 0° to a maximum intrusion angle θmax during the compression or extension of the strain uniformly-distributed stacking structure. The crease only moves along the axis with the crease plane without undergoing deformation.

In some embodiments, the crease formed at the joint of the respective folding faces of the two layers of the adjacent strain uniformly-distributed stacking structure forms a closed curve in the circumferential direction. The closed curve comprises a circle. The area difference factor of the folding faces is $\sigma_k = a(1-\cos\gamma)/(2\cos\gamma - a)$, wherein $\sigma_k$ is the ratio of the area change value of the folding faces when the soft muscle is deformed from the first state to the second state to the area of the folding faces in the first state, γ is the changed value of the intrusion angle θ when the soft muscle is deformed from the first state to the second state. When the soft muscle has an operating differential pressure in the range of −0.08 to 0 Mpa, the value of the initial intrusion angle θp is defined by the formula $\sigma_k$=a(1−cos γ)/(2 cos γ−a), wherein γ=θp, and when 0.4<a<0.55, 0.02<$\sigma_k$<0.185.

In some embodiments, when the soft muscle has an operating differential pressure in the range of −0.08 to 0 Mpa, 0.05<<0.125.

In some embodiments, the flexible sidewall is made of materials satisfying: tensile strength is greater than 5 Mpa, Shore hardness is greater than 60 (it is to be appreciated that that all values involving Shore hardness in this disclosure are taken in units of HA, e.g., 60 HA), resilience is greater than 50%.

In some embodiments, when the soft muscle has an operating differential pressure in the range of −0.08-2 Mpa, the value of the initial intrusion angle θp is defined by the formula $\sigma_k$=a(1−cos γ)/(2 cos γ−a), wherein γ=θp, 0.01<$\sigma_k$<0.1, and the value of the maximum intrusion angle θmax is defined by the formula $\sigma_{k1}$=a(1−cos γ)/(2 cos γ−a), wherein γ=θmax, 0.03<$\sigma_{k1}$<0.12, and $\sigma_{k1}$ also satisfies 1.05$\sigma_k$<$\sigma_{k1}$<2.2$\sigma_k$.

In some embodiments, 0.025<$\sigma_k$<0.08.

In some embodiments, 0.03<$\sigma_k$<0.06.

In some embodiments, 0.05<$\sigma_k$<0.08, and 1.1$\sigma_k$<$\sigma_{k1}$<1.7$\sigma_k$.

In some embodiments, 0.2<a<0.8.

In some embodiments, 0.25<a<0.5.

In some embodiments, 0.3<a<0.45.

In some embodiments, the flexible sidewall is made of materials satisfying: tensile strength is greater than 9 Mpa, Shore hardness is greater than 70, resilience is greater than 40%.

In some embodiments, the flexible sidewall is made of materials satisfying: tensile strength is greater than 12 Mpa, Shore hardness is greater than 80, resilience is greater than 30%.

In some embodiments, the crease formed at the joint of the respective folding faces of the two adjacent layers of the strain uniformly-distributed stacking structure forms a closed curve in the circumferential direction. The closed curve comprises an ellipse or a racetrack shape. In the direction of a short axis of the ellipse or the racetrack shape, the folding faces have a maximum distance d1 from the central axis. The folding faces have a minimum distance d2 from the central axis. The soft muscle has an intrusion depth factor a. The intrusion depth factor a, the maximum distance d1 and the minimum distance d2 are configured to satisfy the following equation: a=(d1−d2)/R, wherein R is the radius of the soft muscle and R=d1.

In some embodiments, the crease formed at the joint of the respective folding faces of the two adjacent layers of the strain uniformly-distributed stacking structure forms a closed curve comprising a fan-ring shape in the circumferential direction, wherein in the radial direction of the fan-ring shape, the folding faces have a maximum distance d1 from the central axis, the difference between the maximum distance and the minimum distance of the folding faces from the central axis is d2, the intrusion depth factor a is configured to satisfy the following equation: a=(d1−d2)/R, wherein R is the radius of the soft muscle and R=d1.

In some embodiments, the fan-ring shape has transition arc at four corners, and the radius $r_0$ of the transition arc of the outer contour of the fan-ring shape satisfies: $r_0$≥R*(1−a).

In some embodiments, the flexible sidewall comprises an inner sidewall and an outer sidewall surrounding an outer side of the inner sidewall, the inner sidewall and the outer sidewall being coaxially disposed and forming an annular region that is configured as cavity for allowing fluid to flow in and out.

In some embodiments, the inner sidewall and the outer sidewall have different initial intrusion angle θp.

In some embodiments, the distance between two adjacent layers in the multilayered crease planes of the inner sidewall is the same as the distance between two adjacent layers in the multilayered crease planes of the outer sidewall.

In some embodiments, the annular shape comprises a circular ring-shape. The plurality of crease planes of the inner sidewall are respectively provided in correspondence with and coplanar with the plurality of creases planes of the outer sidewall. The folding faces of the outer sidewall have a maximum distance d1 from the central axis and the folding faces of the inner sidewall have a minimum distance d2 from the central axis. The soft muscle has an intrusion depth factor a that is configured to satisfy the following equation: a=(d1−d2)/R, wherein R is the radius of the soft muscle and R=d1.

The second aspect of this disclosure provides a soft muscle, comprising two end faces, a flexible sidewall and a drive source port. The flexible sidewall and the two end faces encloses a cylindrical cavity having a central axis. The flexible sidewall is designed to or comprises a multilayered strain uniformly-distributed stacking structure. Each layer of the strain uniformly-distributed stacking structure comprises a folding face. A crease plane is formed at the joint of the folding faces of two adjacent layers of the strain uniformly-distributed stacking structure. The crease plane includes one or more creases. The angle between the adjacent two folding faces and the crease plane is defined as intrusion angle θ. The drive source port is arranged on the flexible sidewall or on the end face. The drive source port is used to move fluid into and out of the cavity to change the differential pressure between inside and outside of the cavity and to enable the strain uniformly-distributed stacking structure to compress or extend so as to drive the end face of the soft muscle to move. The soft muscle has an initial intrusion angle θp in an initial state which varies from 0° to a maximum intrusion angle θmax during the compression or extension of the strain uniformly-distributed stacking structure. The initial intrusion angle θp and the maximum intrusion angle θmax of the soft muscle are configured to satisfy the following equation: 0.6θmax<θp<0.8θmax, and 15°≤θ max≤45°.

In some embodiments, in the initial state, the distance between two adjacent layers in the multilayered crease planes is h, and the wall thickness of the flexible sidewall is t, wherein the distance h, the wall thickness t, and the initial intrusion angle θp are configured to satisfy the following equation: 0.05 h/sin θp<t<0.2 h/sin θp.

In some embodiments, the folding faces have a maximum distance d1 and a minimum distance d2 from the central axis. The soft muscle has an intrusion depth factor a. The intrusion depth factor a, the maximum distance d1 and the minimum distance d2 are configured to satisfy the following equation: a=(d1−d2)/R, wherein R is the radius of the soft muscle and is defined as the radius of the smallest circumscribed circle of the figure formed by sequentially joining one or more of the creases. The maximum distance d1 and the minimum distance d2 are configured such that the intrusion depth factor a of the soft muscle is greater than 0.2.

In some embodiments, the crease formed at the joint of the respective folding faces of the two adjacent layers of the strain uniformly-distributed stacking structure are sequentially joined in the circumferential direction to form a polygon.

In some embodiments, the polygon includes a quadrilateral, and the intrusion depth factor a is configured to satisfy the following equation: 0.2<a<0.8.

In some embodiments, the central axis of one of the two adjacent layers of the quadrilateral and the central axis of the other layer enclose an angle of 90°.

In some embodiments, the polygon includes a hexagon, and the intrusion depth factor a is configured to satisfy the following equation: $0.2<a<0.5$.

In some embodiments, the central axis of one of the two adjacent layers of the hexagon and the central axis of the other layer enclose an angle of 60°.

In some embodiments, a half of the sides of the hexagon is of equal length and forms the long sides of the hexagon, the other half of the sides of the hexagon is of equal length and forms the short sides of the hexagon, and the central angle β of the short sides of the hexagon is configured to satisfy the following equation: $a=\cos\beta-\cos(60°-\beta)$.

In some embodiments, the wall thickness t of the flexible sidewall is further configured to satisfy the following equation: $t<(R*\sin\beta)/3$, wherein β is half of the central angle corresponding to the short sides of a polygon.

In some embodiments, a half of the creases is of equal length and forms the long sides of the polygon, the other half of the creases is of equal length and forms the short sides of the polygon.

In some embodiments, the ratio of the length of the long side of the polygon to the length of the short side of the polygon is set to be greater than 2.

In some embodiments, in the initial state, the distances between two adjacent layers in the multilayered crease planes are the same and are all h.

In some embodiments, the crease formed at the joint of the respective folding faces of the two adjacent layers of the strain uniformly-distributed stacking structure forms a closed curve in the circumferential direction, and the intrusion depth factor a is configured to satisfy the following equation: $0.2<a<0.4$.

In some embodiments, the maximum intrusion angle θmax of the soft muscle is configured to satisfy the following equation: $27°<\theta\ max<42°$.

In some embodiments, during compression or extension of the strain uniformly-distributed stacking structure, the area change rate $\sigma_A$ of the folding faces of the soft muscle satisfies the following equation: $0.001<\sigma_A<0.03$, wherein the area change rate $\sigma_A=2a(1-\cos\theta)/(2-a)$.

In some embodiments, the soft muscle further comprises a connecting portion. The connecting portion is arranged on the end face of the soft muscle. The axial dimension t1 and the radial dimension t2 of the connecting portion are configured to satisfy the following equation: $t<t1<6t$, $a*R<t2<1.5a*R$, wherein t is the wall thickness of the flexible sidewall, and the soft muscle has a radius R.

In some embodiments, the connecting portion is integrally formed on the end face of the soft muscle.

In some embodiments, the soft muscle further comprises a support member. The support member is disposed in the cavity of the soft muscle near the end face. The support member has a shape adapted to the shape of the connecting portion. One of the support member and the connecting portion has a first positioning portion, and the other one having a form-fit second positioning portion. The first positioning portion and the second positioning portion form a concave-convex fit. The first positioning portion and the second positioning portion have a maximum dimension t3 in at least one of the axial and radial directions, which is configured to satisfy the following equation: $2t<t3$.

In some embodiments, the soft muscle further comprises a hooking portion. The hooking portion is arranged on the end face. The hooking portion is used for mating with a mating member in the operation environment to hook the soft muscle on the mating member.

In some embodiments, the soft muscle has an initial height H in the initial state and a radius R, which are configured to satisfy the following equation: $H/R<4$.

In some embodiments, the initial height H and the radius R of the soft muscle are configured to satisfy the following equation: $0.6<H/R<3$.

In some embodiments, the folding faces of the two adjacent layers of the strain uniformly-distributed stacking structure are provided with chamfers at the positions where they are joined by the creases.

In some embodiments, the chamfer has a radius r and the radius r of the chamfer and the wall thickness t of the flexible sidewall satisfy the following equation: $r<0.5t$.

In some embodiments, the inner side of the folding face has a radius r1 at the chamfer, the outer side of the folding face has a radius r2 at the chamfer, the folding face has a thickness t0, and the chamfer satisfies: $r1\leq t0$, $r1+0.50\leq r2\leq 3t0$.

In some embodiments, the chamfer satisfies: $0.110\leq r1\leq 0.5t0$.

In some embodiments, the soft muscle further comprises reinforcing ribs. The reinforcing ribs are arranged in the cavity and at the creases recessed towards the cavity. The radial size t4 and the axial size t5 of the reinforcing ribs are configured to satisfy the following equation: $t5<t4<10t$, $t<t5<2t$, wherein t is the wall thickness of the flexible sidewall.

In some embodiments, the soft muscle further comprises a crease shaping member. The crease shaping member is arranged at the creases of the flexible sidewall protruding outwards and is used for limiting the shape of the crease in the axial direction.

In some embodiments, the crease shaping member includes an outer crease shaping member located outside the convex side of the crease of the flexible sidewall and an inner crease shaping member located inside the concave side of the crease of the flexible sidewall. The outer crease shaping member is fit to the outer contour of the crease, and the inner crease shaping member is fit to the inner contour of the crease. The outer crease shaping member has a radial dimension t6 and an axial dimension t7 and satisfies: $0.510\leq t6\leq 3t0$, $0.5t0\leq t7\leq 2.5t0$.

In some embodiments, the central axis of the cavity of the soft muscle has a curvature of 0 and the distance between the respective crease planes is the same.

In some embodiments, the central axis of the cavity of the soft muscle has a curvature greater than 0 and the angle between the respective crease planes is the same.

In some embodiments, the folding face of at least one layer of the strain uniformly-distributed stacking structure has a predetermined curved profile that exhibits a trigonometric or spline curve orientation.

In some embodiments, during compression or extension of the strain uniformly-distributed stacking structure, the folding face of the strain uniformly-distributed stacking structure has a uniform strain distribution.

In some embodiments, the two folding faces on both sides of the crease plane are of the same shape and are symmetrical about the crease plane.

In some embodiments, the soft muscle is made of materials satisfying: tensile strength is greater than 9 Mpa, Shore hardness is greater than 80, resilience is greater than 30%.

The third aspect of this disclosure provides a soft muscle, comprising two end faces, a flexible sidewall and a drive source port. The flexible sidewall and the two end faces encloses a cylindrical cavity having a central axis. The flexible sidewall is designed to or comprises a multilayered strain uniformly-distributed stacking structure. The strain uniformly-distributed stacking structure therein comprises a first layer of strain uniformly-distributed stacking structure and a second layer of strain uniformly-distributed stacking structure with folding faces and sequentially adjacent to each other. And between the first layer of strain uniformly-distributed stacking structure and the second layer of strain uniformly-distributed stacking structure, a first crease plane with at least one crease is formed. The axially adjacent folding faces of the first layer of strain uniformly-distributed stacking structure and the second layer of strain uniformly-distributed stacking structure are configured to be symmetrically arranged about the first crease plane, and the angle between the respective folding face and the first crease plane is defined as intrusion angle θ. The folding faces have a maximum distance d1 and a minimum distance d2 from the central axis. The soft muscle has an intrusion depth factor a. The intrusion depth factor a, the maximum distance d1 and the minimum distance d2 are configured to satisfy the following equation: a=(d1−d2)/R, wherein R is the radius of the soft muscle. The maximum distance d1 and the minimum distance d2 are configured such that the intrusion depth factor a satisfies 0.2<a<0.8.

A drive source port, which is arranged on the flexible sidewall or on the end face. The drive source port is used to move fluid into and out of the cavity to change the differential pressure between inside and outside of the cavity and to enable the strain uniformly-distributed stacking structure to compress or extend so as to drive the end face of the soft muscle to move.

The soft muscle has an initial intrusion angle θp in an initial state which varies from 0° to a maximum intrusion angle θmax during the compression or extension of the strain uniformly-distributed stacking structure. The initial intrusion angle θp and the maximum intrusion angle θmax of the soft muscle are configured to satisfy the following equation: 0.6θmax<θp<0.8θmax, and 15°≤θ max≤45°.

In some embodiments, the multilayered strain uniformly-distributed stacking structure includes a third layer of strain uniformly-distributed stacking structure with a folding face adjacent to the second layer of strain uniformly-distributed stacking structure. A second crease plane with at least one crease is formed between the second layer of strain uniformly-distributed stacking structure and the third layer of strain uniformly-distributed stacking structure. The folding face of the second layer of strain uniformly-distributed stacking structure and the axially adjacent folding face of the third layer of strain uniformly-distributed stacking structure are configured to be arranged symmetrically about the second crease plane.

In some embodiments, the central axis of the cavity of the soft muscle is configured as a straight line and the distance between the first and second crease planes is a fixed value.

In some embodiments, the central axis of the cavity of the soft muscle is configured as an arc and the angle between the first and second crease planes is a fixed value.

In some embodiments, the distance between the first and second crease planes is h, and the wall thickness of the flexible sidewall is t, wherein the distance h, the wall thickness t, and the initial intrusion angle θp are configured to satisfy the following equation: 0.05 h/sin θp<t<0.2 h/sin θp.

In some embodiments, the wall thickness t of the flexible sidewall is further configured to satisfy the following equation: t<(R*sin β)/3, wherein β is half of the central angle corresponding to the short sides of a polygon.

The fourth aspect of this disclosure provides a transmission structure, comprising an end plate and at least two above-mentioned soft muscles arranged side by side, the end plates being provided at two ends of at least two of the soft muscles, the at least two soft muscles having parallel central axes, in the initial state, the end plates at the same end being in the same plane and the end plates being fixedly connected to the soft muscle.

In some embodiments, the transmission structure further comprises a communication member.

The fifth aspect of this disclosure provides a transmission structure, comprising a push plate, an end plate and an even number of above-mentioned soft muscles axially arranged, central axes of the soft muscles are collinear, the push plate being provided between two of the axially arranged soft muscles, the end plate being provided at the other end of two of the axially arranged soft muscles, which is far away from the push plate, the end plate being fixedly connected to the soft muscles, the push plate having a screw through which a bolt passes.

In some embodiments, the transmission structure further comprises a communication member.

The sixth aspect of this disclosure provides a robot, comprising at least one above-mentioned soft muscle or at least one above-mentioned transmission structure.

The seventh aspect of this disclosure provides a method of producing a soft muscle, including the steps of: providing a casting mould; liquefying and casting a preparation material into the mould; and heating the mould to form the above-mentioned soft muscle.

In some embodiments, the step of heating the mould includes heating the mould to a temperature higher than 180° C.

In some embodiments, the method of producing a soft muscle, further includes the step of spraying a polymeric material coating on an outer side of the soft muscle after the soft muscle is formed.

The eighth aspect of this disclosure provides a method of designing a manipulator, including the steps of: obtaining a working requirement and selecting the transmission structures as mentioned above as an arm joint based on the working requirement; obtaining an ambient pressure and a work load based on the working requirement and obtaining a workspace and a work stroke based on the transmission structure of the selected arm joint; and selecting, based on the soft muscle as mentioned above, a type of the soft muscle and determining an initial height H, a radius R, an intrusion depth factor a, an initial intrusion angle θp, a maximum intrusion angle θmax, and a wall thickness t of the flexible sidewall of the soft muscle based on a shape of a corresponding crease.

Based on the aspects provided by this disclosure, a soft muscle, comprising two end faces, a flexible sidewall and a drive source port, the flexible sidewall and the two end faces enclosing to form a cylindrical cavity having a central axis, the flexible sidewall being designed to or comprising a strain uniformly-distributed stacking structure, which is formed by stacking strain uniformly-distributed stacking layers of identical shapes so that the strain of the entire sidewall is distributed uniformly across the strain uniformly-distributed stacking layers, the strain uniformly-distributed stacking layers comprising at least one strain unit with a folding face and a crease, based on a combination of the shape, thickness and stacking manner of the strain units, the strain of the individual strain unit being uniformly distributed on the folding face instead of being concentrated at the crease, the drive source port being provided on the flexible sidewall or on the end face and being used to change the differential pressure between inside and outside of the cavity and to cause the strain uniformly-distributed stacking structure to compress or extend to drive the end face of the soft muscle to move, The strain uniformly-distributed stacking layer is enclosed by a single or a plurality of folding faces, at the joint of the folding faces of two adjacent layers of the strain uniformly-distributed stacking structure, a crease plane with at least one crease is formed, wherein the soft muscle has an intrusion angle θ, an intrusion depth factor a and a wall thickness t, the intrusion angle θ is the angle between two adjacent layers of the folding faces and the crease plane, the intrusion angle θ varies with the compression or extension of the strain uniformly-distributed stacking structure, and a difference between distances from a convex crease and a concave crease on a strain unit to a central axis is defined as degree of depression, the intrusion depth factor a is the proportion of the degree of depression to the overall size of the convex crease, and the wall thickness t is a thickness of the flexible sidewall. The intrusion angle θ, the intrusion depth factor a and the wall thickness t are numerically related to each other and have predefined combinations of values, such that during the deformation of the soft muscle, only folding or unfolding of the strain uniformly-distributed stacking structure occurs on the flexible sidewall, and the strain of the flexible sidewall is uniformly distributed on each of the folding faces instead of being concentrated at the creases. The folding faces and creases have one or two basic shapes that are repeated or gradually change in proportion. The basic shapes are circumferentially distributed about the central axis to form a layer of the strain uniformly-distributed stacking layers, and the strain uniformly-distributed stacking layers extend along the central axis to form the strain uniformly-distributed stacking structure which is repetitively stacked in the axial direction. At the joint of the folding faces of two adjacent layers of the strain uniformly-distributed stacking layers, a crease plane is formed, which has creases having the contour in a form of a closed curve or a polygon. The creases on the spaced crease planes in the direction of the central axis have the same shape and the same position with respect to the central axis. The creases on the spaced crease planes and the creases on the adjacent crease planes have different concave and convex states on the flexible sidewall. The soft muscle has an initial intrusion angle θp in an initial state which varies from 0° to a maximum intrusion angle θmax during the compression or extension of the strain uniformly-distributed stacking structure. The crease only moves along the axis with the crease plane without undergoing deformation.

Through the soft muscle provided by some embodiments of this disclosure, it is possible to achieve a linear relationship between the internal and external differential pressure ΔP and the output force of the end surface, and during the folding or extension process, the soft muscle mainly involves the folding of the folding faces, with very little change in the area of the soft muscle itself. In other words, the energy of the fluid entering the cavity is mainly used to enable the strain uniformly-distributed stacking structure to fold or extend, and strain of the strain uniformly-distributed stacking structure itself can be small. In some advantageous embodiments, the strain uniformly-distributed stacking structure itself has very small internal stress. Thus, only a small percentage of the energy of the fluid is used to overcome the stress resulting from the deformation of the strain uniformly-distributed stacking structure itself, and thus this soft muscle has a high energy transfer efficiency. In some advantageous embodiments, the small strain is uniformly distributed over the entire folding face in the deformation process of this soft muscle, so that the soft muscle can bear or output a greater load, withstand more compression and stretching and have a longer service life than other existing soft muscle.

Other features and advantages of the disclosure will become clear from the following detailed description of exemplary embodiments thereof with reference to the accompanying drawings.

BRIEF DESCRIPTION OF THE DRAWINGS

The accompanying drawings illustrated herein are used to provide a further understanding of the disclosure and are incorporated in and constitute a part of this disclosure. The exemplary embodiments of the disclosure and the description thereof serve to explain the disclosure and not to constitute an undue limitation of the disclosure. In the drawings.

In the figures.

Figure 1:
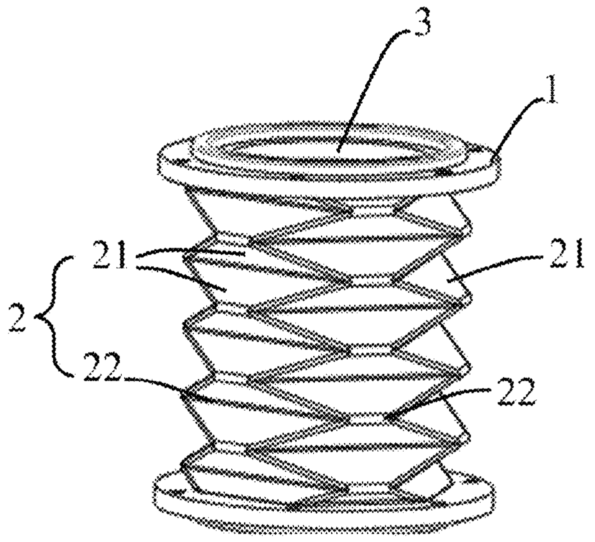
FIG. 1 shows a schematic view of a soft muscle according to some embodiments of the disclosure with hexagonal creases.

1. End face; 2. Flexible sidewall; 21. Folding face; 22. Crease; 3. Drive source port; 4. Connection portion; 5. Support member; 6. Crease shaping member; 61. Outer crease shaping member; 62. Inner crease shaping member; 7. Hooking portion.

DETAILED DESCRIPTION OF THE EMBODIMENTS

With reference to the accompanying drawings in the embodiments of the disclosure, the technical solutions in the embodiments of the disclosure will be described clearly and completely. Apparently, the embodiments described are only some embodiments of the disclosure, rather than all embodiments. The following description of at least one exemplary embodiment is in fact merely illustrative and is in no way limits the disclosure and its application, or uses. All other embodiments, which can be derived by a person skilled in the art from the embodiments disclosed herein without creative effort, are intended to be within the scope of the present disclosure.

The relative arrangement of parts and steps, numerical expressions and numerical values set forth in these embodiments do not limit the scope of the disclosure unless specifically stated otherwise. Meanwhile, it should be understood that the sizes of the respective portions shown in the drawings are not drawn in an actual proportional relationship for the convenience of description. Techniques, methods, and apparatus known to one of ordinary skill in the relevant art may not be discussed in detail, but are intended to be part of the specification where appropriate. In all examples shown and discussed herein, any particular value should be construed as exemplary only and not as limiting. Thus, other examples of the exemplary embodiments may have different values. It should be noted that: similar reference signs and letters refer to similar items in the accompanying drawings bellow, and thus, once an item is defined in one figure, it need not be discussed further in subsequent figures.

For ease of description, spatially relative terms, such as “above”, “over”, “on”, “upper”, and the like, may be used herein to describe one device or feature’s spatial positional relationship to another device or feature as illustrated in the figures. It should be understood that the spatially relative terms are intended to encompass different orientations of the device in use or operation in addition to the orientation of the device depicted in the figures. For example, if a device in the figures is inverted, the device described as “above other devices or configurations” or “over other devices or configurations” would later be oriented as “below other devices or configurations” or “under other devices or configurations”. Thus, the exemplary term “above” may include two orientations of “above” and “below”. The device may also be positioned in other different ways and the spatially relative descriptors used herein interpreted accordingly.

Due to the large deformation range of soft muscles, there is a risk that the overall strain of the material is large (the material itself cannot be absolutely homogeneous due to the manufacturing process), resulting in a large peak of local strain that exceeds the elastic deformation range of the material, and thus local failure (reduced elasticity, microcracks, etc.) occurs, which affects the service life. By targetedly designing the shape of the soft muscle with a stacked structure to adapted to various types of working conditions, the overall strain is possibly uniformly distributed on the flexible sidewall (or, uniformly distributed on each folded face) rather than concentrated in the crease, which has an obvious positive significance for improving the energy transfer efficiency of the soft muscle, enhancing environmental and working tolerance (such as a wider temperature range, a larger differential pressure, etc.), and prolonging the service life.

There have been cases in the prior art which apply the folded soft muscle to robots, but there are many shortcomings. For example, in the widely used manipulators and robots at present, the most common form is the combination of rigid drive components (such as motors, hydraulic cylinders, air cylinders, etc.) with rigid structural components and rigid transmission components. Due to the characteristic that all the drive components and structural components are of rigid structure, one or more of the following problems may exist: a. It may cause mechanical damage and harm to surrounding organisms or objects, and thus the safety is not good; b. The electric drive brings about electrical damage and injury; c. The degree of freedom of a single arm joint is limited, the working range is restricted, and the environmental adaptability is poor. To increase the degree of freedom, it is necessary to increase the number of arm joints and the corresponding rotating mechanisms and speed reduction mechanisms, which will lead to new problems (at present, robot joints usually employ the RV speed reduction mechanism and harmonic speed reduction mechanism, which have a high unit price, accounting for a large proportion in the cost composition); d. The load-to-weight ratio is small, and the energy efficiency ratio is small. In order to overcome these problems, in some existing technologies, flexible components are incorporated. For example, elastic components (springs, rubber, etc.) are used to connect rigid components, or a pull rope control solution is adopted, etc. However, these solutions all have some deficiencies. For instance, the solution using elastic components cannot simplify structure or reduce weight, nor can it solve the above-mentioned shortcomings a to d. In the pull rope control solution, each control unit requires an independent drive module. As the load and operating distance increase, the volume, the self-weight and the power consumption of the entire system, as well the difficulty of precise control will double accordingly, resulting in problems such as high costs, difficulty in layout, and difficulty in achieving the desired operation effect.

In addition, in the prior art, there are also some fluid-driven artificial muscles working as actuator independently, or in combination with rigid structural components and transmission components to form fingers, claws or manipulators to work. In particular, such artificial muscles are partially or wholly enclosed by the flexible outer wall in a cavity, and the sidewalls are driven to change their shape and/or size by the fluid in the cavity, so that the artificial muscles are operated in the direction in which the changes occur. However, such artificial muscles cannot overcome the above problems a-d and introduce new problems; e. either one or both of the working stroke and working load is/are small; f. the change in the fluid volume cannot be linearly related to the displacement, so a stable output force (output force=fluid pressurexcross-sectional area) and displacement cannot be obtained; g. If the fluid is constrained in directions other than the working direction to solve problem e, the proportion of rigid structural components has to be increased, and as a result, one or all of the problems a to d cannot be solved. In order to solve the above problems, some of these artificial muscles employ a flexible outer wall with a folding structure. However, there is still no clear structural feature or design principle for artificial muscles with a folding structure that claims to be able to solve the aforementioned problems a to g. Moreover, a general folding structure without special design introduces new problems; h. The strain of the folding structure is likely to concentrate at the intersections of the folding faces, which leads to locally high values of strain and easily causes the deformation of material that goes beyond the elastic range, thereby resulting in deformations of the fluid cavity, such as bulging and collapse, even fatigue cracking, which will damage the tightness of the cavity and result in failure.

In summary, the soft muscles in the prior art will deviate from their preset folded states during the operation process. In order to comprehensively solve at least a part of the above technical problems, this disclosure provides a soft muscle, which features high pressure resistance, small strain and long service life, and is capable of overcoming at least a part of the above-mentioned technical disadvantages.

Figure 3:
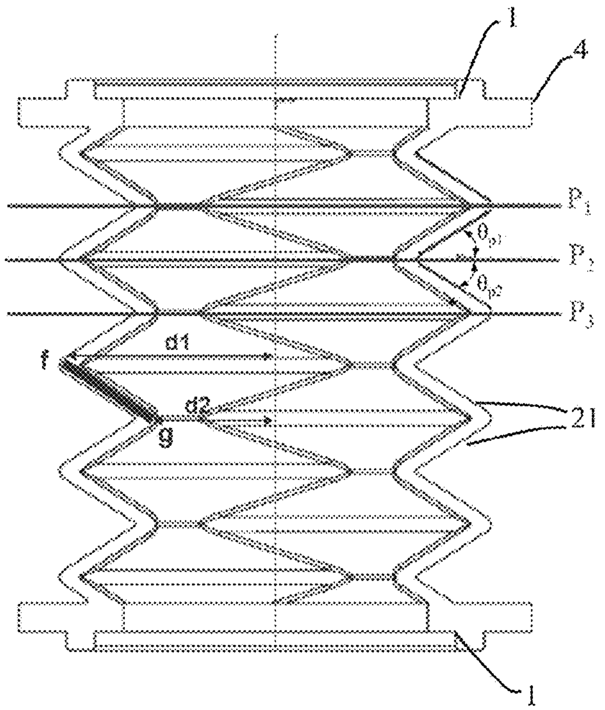
FIG. 3 shows a sectional view of the soft muscle of FIG. 1.

Referring to FIGS. 1 and 3, this disclosure provides a soft muscle, comprising two end faces 1, a flexible sidewall 2 and a drive source port 3. The flexible sidewall 2 and the two end faces 1 enclose to form a cylindrical cavity having a central axis. The flexible sidewall 2 is designed to or comprises a strain uniformly-distributed stacking structure, which is formed by stacking strain uniformly-distributed stacking layers of identical shapes so that the strain of the entire sidewall is distributed uniformly across the strain uniformly-distributed stacking layers. The strain uniformly-distributed stacking layers comprise at least one strain unit with a folding face 21 and a crease 22. Based on a combination of the shape, thickness and stacking manner of the strain units, the strain of the individual strain unit is uniformly distributed on the folding face 21 instead of being concentrated at the crease 22. The drive source port 3 is provided on the flexible sidewall 2 or on the end face 1 and is used to change the differential pressure between inside and outside of the cavity and to cause the strain uniformly-distributed stacking structure to compress or extend, thereby driving the end face 1 of the soft muscle to move. The strain uniformly-distributed stacking layer is enclosed by a single or a plurality of folding faces 21. At the joint of the folding faces 21 of two adjacent layers of the strain uniformly-distributed stacking structure, a crease plane with at least one crease 22 is formed. The soft muscle has an intrusion angle θ, an intrusion depth factor a and a wall thickness t. The intrusion angle θ is the angle between two adjacent layers of the folding faces 21 and the crease plane. The intrusion angle θ varies with the compression or extension of the strain uniformly-distributed stacking structure. A difference between distances from a convex crease and a concave crease on a strain unit to a central axis is defined as degree of depression. The intrusion depth factor a is the proportion of the degree of depression to the overall size of the convex crease. The wall thickness t is the thickness of the flexible sidewall 2. The intrusion angle θ, the intrusion depth factor a and the wall thickness t are numerically related to each other and have predefined combinations of values, such that during the deformation of the soft muscle, only folding or unfolding of the strain uniformly-distributed stacking structure occurs on the flexible sidewall 2, and the strain of the flexible sidewall 2 is uniformly distributed on each of the folding faces 21 instead of being concentrated at the creases. The folding faces 21 and creases 22 have one or two basic shapes that are repeated or gradually change in proportion. The basic shapes are circumferentially distributed about the central axis to form a layer of the strain uniformly-distributed stacking layers, and the strain uniformly-distributed stacking layers extend along the central axis to form the strain uniformly-distributed stacking structure which is repetitively stacked in the axial direction. At the joint of the folding faces 21 of two adjacent layers of the strain uniformly-distributed stacking layers, a crease plane is formed, which has creases 22 having the contour in a form of a closed curve or a polygon. In the direction of the central axis, the creases on the spaced crease planes have the same shape and the same position with respect to the central axis. The creases on the spaced crease planes and the creases on the adjacent crease planes have different concave and convex states on the flexible sidewall 2. The soft muscle has an initial intrusion angle θp in an initial state which varies from 0° to a maximum intrusion angle θmax during the compression or extension of the strain uniformly-distributed stacking structure. The crease 22 only moves along the axis with the crease plane without undergoing deformation.

The drive source port 3 can be arranged in the form of an opening for fluid to flow in and out. The fluid is allowed to flow in and out of the cavity, so as to change the differential pressure between the inside and outside of the soft muscle and drive the soft muscle to deform. In this case, the soft muscle is fluid-driven. The electric control form can also be adopted, i.e. the drive source port 3 is electrically connected to the external electric drive means to change the differential pressure in the electric manner. Alternatively, a chemical reaction form can also be adopted to provide the driving force.

Moreover, the strain uniformly-distributed stacking structure can be clearly distinguished from the folding structure in the prior art and results in unexpected effects.

Through the soft muscle provided by this disclosure, it is possible to achieve high load and large stroke with a light self-weight. The soft muscle of this disclosure has a large compression ratio and meanwhile a remarkable and stable anisotropic mechanical properties. When subjected to force, it is more inclined to regular and uniform axial expansion and contraction as well as lateral bending rather than irregular bulges and depressions. Moreover, it can restore its initial shape after the external force is removed, and it can withstand a large number of high-frequency deformations (millions of times) while maintaining the above-mentioned characteristics. Therefore, it can be combined with simple and lightweight rigid structural components to form various basic arm joints, stably realizing the basic functions of omnidirectional bending and directional expansion and contraction. Based on these basic functions, it can be highly adaptable to combine different manipulators for different specific working conditions. With a simple structure and control system, and with a low-cost and high-efficient manufacturing, use and maintenance, it can achieve the same or even more flexible, reliable and safe operations, and thus has significant progress compared with traditional rigid manipulators and flexible manipulators.

With continued reference to FIGS. 1 and 3, the soft muscle can comprise two end faces 1, a flexible sidewall 2 and a drive source port 3. The flexible sidewall 2 and the two end faces 1 can enclose a cylindrical cavity having a central axis. The flexible sidewall 2 can be designed to or comprise a multilayered strain uniformly-distributed stacking structure. Each layer of the strain uniformly-distributed stacking structure can comprise a folding face 21. A crease plane can be formed at the joint of the folding faces 21 of two adjacent layers of the strain uniformly-distributed stacking structure. The crease plane can include one or more creases 22, in particular multiple circumferentially successive creases. The angle between the adjacent two folding faces 21 and the crease 22 can be defined as intrusion angle θ. The drive source port 3 can be arranged on the flexible sidewall 2 or on the end face 1. The drive source port 3 can be used to move fluid into and out of the cavity to change the differential pressure between inside and outside of the cavity and to enable the strain uniformly-distributed stacking structure to compress or extend so as to drive the end face 1 of the soft muscle to move. The soft muscle may have an initial intrusion angle θp in an initial state which varies from 0° to a maximum intrusion angle θmax during the compression or extension of the strain uniformly-distributed stacking structure. The initial intrusion angle θp and the maximum intrusion angle θmax of the soft muscle may be configured to satisfy the following equation: $0.6\theta max<\theta p<0.8\theta max$, and $15°\leq\theta\ max\leq45°$.

Further, a substantially linear relationship between the internal and external differential pressure ΔP and the output force of the end surface is achieved. Besides, it is possible that during the folding or unfolding process, the soft muscle mainly involves the folding of the folding face 21, with very little change in the area of the soft muscle itself. In other words, the energy of the fluid entering the cavity can be mainly used to enable the strain uniformly-distributed stacking structure to fold or retract and extend, and thus strain of the strain uniformly-distributed stacking structure itself can be small (the strain generated in the deformation process is always in the elastic deformation range of the material and is less than 20%, 15%, 10%, 5% or 1%; in order to facilitate description, this feature is hereinafter referred to as small strain). In some embodiments, the strain uniformly-distributed stacking structure itself will have very small internal stress. Thus, only a small percentage of the mechanical energy of the fluid is used to overcome the stress resulting from the deformation of the strain uniformly-distributed stacking structure itself, and most of the mechanical energy of the fluid is reversibly converted into the elastic potential energy in the extension-compression reciprocating movement of the soft muscle and is released as the mechanical energy of the soft muscle in the changing process in the opposite direction. As a result, this soft muscle has a high energy transfer efficiency. In some embodiments, the small strain can be uniformly distributed over the entire folding face 21 in the deformation process of this soft muscle, so that the soft muscle can bear or output a greater load, withstand more compression and stretching and have a longer service life than other existing soft muscles.

Figure 2:
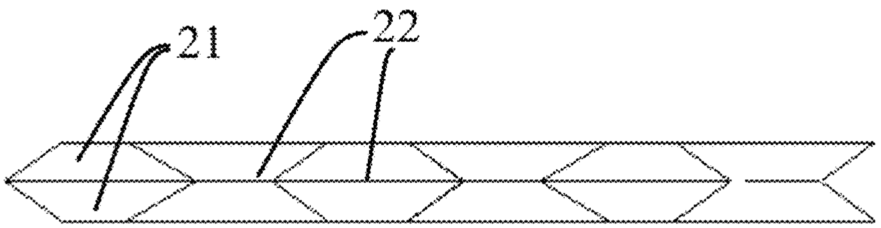
FIG. 2 shows an unfolded schematic view of two adjacent layers of a strain uniformly-distributed stacking structure in the soft muscle of FIG. 1.
Figure 6:
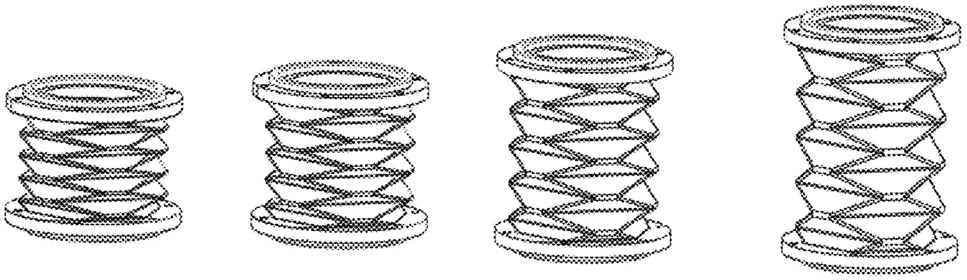
FIG. 6 shows a schematic view of the deformation of the soft muscle of FIG. 1 during actuation.

In particular, FIG. 2 shows an unfolded schematic view of two adjacent layers of a strain uniformly-distributed stacking structure in the soft muscle with hexagonal creases. FIG. 3 shows a sectional view of the hexagonal creases in the initial state. As shown in FIGS. 2 and 3, the thin solid lines P1 to P3 respectively represent three consecutive crease planes among the multilayered crease planes of this soft muscle. It can be seen that there can be two folding faces 21 symmetrical about the folding face P2 between the two crease planes P1 and P3. The angles between these two folding faces 21 relative to the crease plane P2 (also known as intrusion angle) can be θp1 and θp2, respectively. FIG. 6 exemplarily illustrates the state view of the folding deformation of the soft muscle. In particular, when the total amount of the fluid (which can be gas or liquid) in the cavity increases, the soft muscle will stretch until a new balance is reached among the differential pressure between the inside and outside of the cavity, the load acting on the end face 1 of the soft muscle, and the internal stress of the soft muscle itself. At this time, the soft muscle stops deforming. Correspondingly, when the total amount of the fluid in the cavity decreases, the soft muscle will be folded until a new balance is reached among the differential pressure between the inside and outside of the cavity, the load acting on the end face 1 of the soft muscle, and the internal stress of the soft muscle itself. At this time, the soft muscle stops deforming. Throughout the deformation, the two angles θp1 and θp2 synchronously become larger or smaller and can remain essentially the same all the time.

Of course, in some embodiments, an increase in the total amount of fluid in the cavity does not necessarily mean that the soft muscle will be in the stretched state. It may also be in a compressed state under the action of the load on the end face. That is, the soft muscle is in a state of force equilibrium under the combined action of the resultant force of the internal and external differential pressure acting on the flexible sidewall, the end face load, and the internal stress of the soft muscle itself.

In some embodiments, the initial intrusion angle θp can be advantageously configured to satisfy the following equation: $10°<\theta p<30°$. Advantageously, a smaller strain and/or a more uniform strain distribution during deformation of the strain uniformly-distributed stacking structure of the soft muscle can be advantageously induced by setting an advantageous range of initial intrusion angle.

It is to be appreciated that the maximum intrusion angle θmax should be understood as the state that a soft muscle can achieve under its own rated operation range, e.g., the rated differential pressure range (in the case of an external air pressure of 0.1 Mpa, for example, the rated differential pressure range is from −0.08 to 2 Mpa), but not the state that can be achieved under the physical limit. Usually, the soft muscle can achieve an optimal operation performance in rated operation range. For example, it can achieve a folding service life of nearly 3 million times.

In order to enable the soft muscle to produce possibly uniform strain distribution in the process of folding deformation, in some embodiments, in the initial state, the distance between two adjacent layers in the multilayered crease planes is h, and the thickness of the flexible sidewall 2 is t. The distance h, the wall thickness t and the initial intrusion angle θp can be advantageously configured to satisfy the following equation: 0.05 h/sin θp<t<0.2 h/sin θp. In particular, the wall thickness t of the flexible sidewall 2 is not varied during the folding deformation of the soft muscle.

Figure 12:
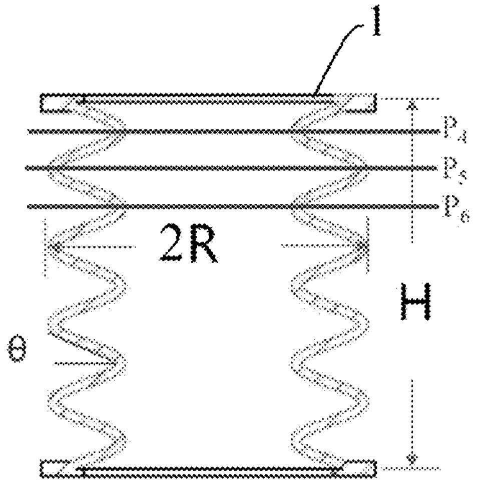
FIG. 12 shows a sectional view of the soft muscle of FIG. 11.

In some embodiments, the soft muscle has an initial height H in the initial state and a radius R. The initial height H and the radius R of the soft muscle can be advantageously configured to satisfy the following equation: H/R<4. Referring to FIG. 12, the radius R of the soft muscle indicates the radius of the smallest circumscribed circle of the figure formed by sequentially joining one or more of the creases 22. When the dimensional characteristics of the soft muscle meet the aforesaid relationship, it has a good lateral stability.

In order to further improve the lateral stability of the soft muscle, in some embodiments, the initial height H and the radius R of the soft muscle can be advantageously configured to satisfy the following equation: 0.6<H/R<3. Advantageously, better lateral stability can be unexpectedly obtained by setting a numerical relationship between the favorable initial height H and the radius R.

In some embodiments, the folding faces 21 have a maximum distance d1 from the central axis. The folding faces 21 have a minimum distance d2 from the central axis. The soft muscle has an intrusion depth factor a. The intrusion depth factor a, the maximum distance d1 and the minimum distance d2 can be advantageously configured to satisfy the following equation: a=(d1−d2)/R, wherein the maximum distance d1 and the minimum distance d2 are configured such that the intrusion depth factor a of the soft muscle is greater than 0.2.

Due to the small strain of the soft muscle in this disclosure, its intrusion depth factor a is substantially a fixed value during the deformation. Further, the folding deformation performance of the soft muscle in this disclosure can be improved when a is greater than 0.2. Furthermore, for the corresponding soft muscle, its end face load and the ambient pressure together determine the internal pressure range in the cavity required for operation. The internal pressure range in the cavity determines the range of the wall thickness t of the flexible sidewall. On this basis, in order to further uniformly distribute the strain, on the premise that the range of aθ meets the aforementioned conditions, the specific values of a and θ are adjusted in such a way that, on the premise that t meets the cavity internal pressure requirements, t has a ratio of t/(h×sin θ) in a preferable range.

Figure 7:
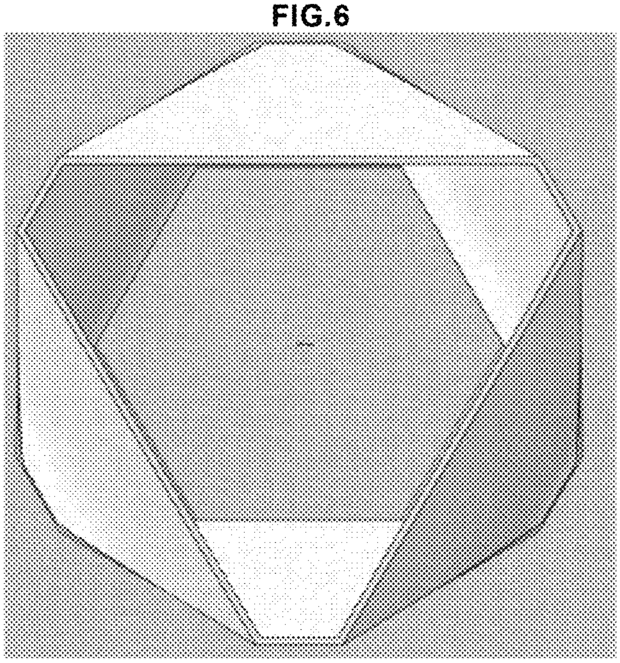
FIG. 7 shows a sectional view of a crease of a layer of the soft muscle of FIG. 1.
Figure 8:
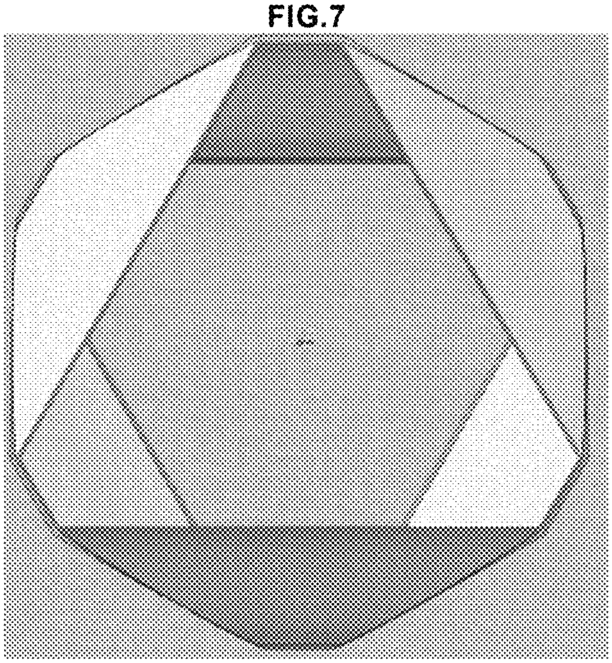
FIG. 8 shows a sectional view of a crease of the layer adjacent to the crease of FIG. 7.

Soft muscles provided by this disclosure can be divided into two types according to the characteristics of the crease. The first type is the soft muscle with polygonal creases. Referring to FIGS. 1 and 7-8, in some embodiments, the creases 22 formed at the joint of the respective folding faces 21 of two adjacent layers of the strain uniformly-distributed stacking structure are sequentially joined in the circumferential direction to form a polygon. This polygon is coplanar with the corresponding crease plane. The distances between the respective crease planes can advantageously be configured to be the same.

In some embodiments, a half of multiple creases 22 is of equal length and forms the long sides of the polygon, the other half of the multiple creases is of equal length and forms the short sides of the polygon. In particular, the long and short sides can be alternately arranged and connected in sequence to form a polygonal crease.

In some embodiments, the ratio of the length of the long side of the polygon to the length of the short side of the polygon is set to be greater than 2.

Figure 13:
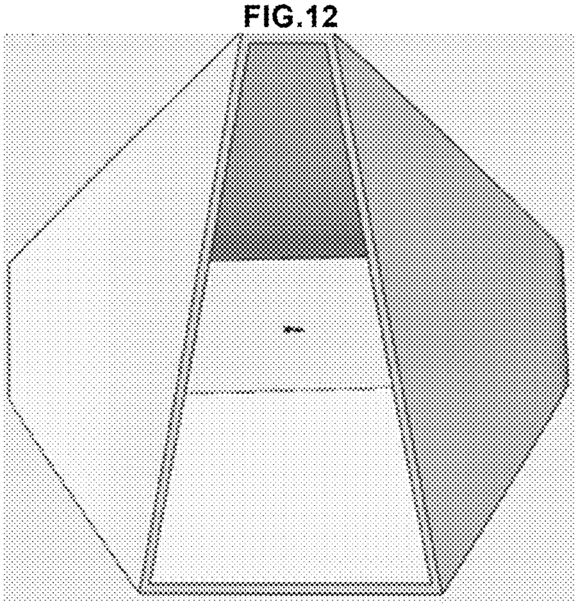
FIG. 13 shows a schematic view of a crease of a layer of a soft muscle according to some further embodiments of the disclosure with quadrilateral creases.
Figure 14:
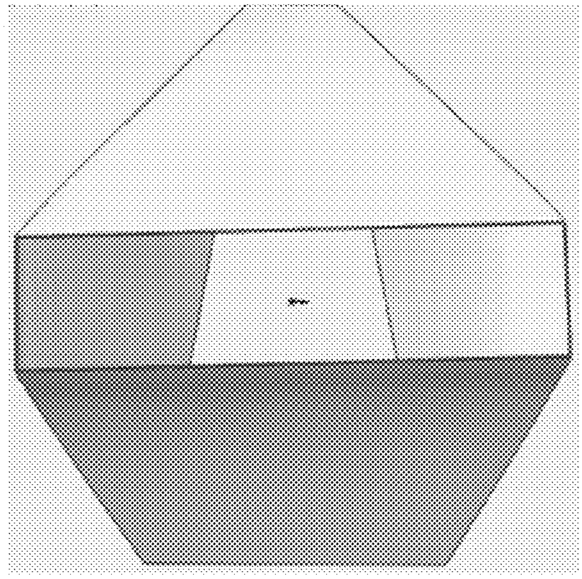
FIG. 14 shows a sectional view of creases of the adjacent layers of the soft muscle of FIG. 13.

Referring to FIGS. 13 and 14, in some embodiments, the polygon comprises a quadrilateral, and the intrusion depth factor a is configured to satisfy the following equation: 0.2<a<0.8. Advantageously, in relation to the crease characteristics of the soft muscle, better folding deformation performance of the soft muscle can be unexpectedly obtained by setting an advantageous range of intrusion depth factor. In some embodiments, the quadrilateral is a rectangle.

In some embodiments, the central axis of one of the two adjacent layers of the quadrilateral and the central axis of the other layer enclose an angle of 90°.

Referring to FIGS. 7 and 8, in some embodiments, the polygon comprises a hexagon, and the intrusion depth factor a is configured to satisfy the following equation: 0.2<a<0.5. Advantageously, in relation to the crease characteristics of the soft muscle, better folding deformation performance of the soft muscle can be unexpectedly obtained by setting an advantageous range of intrusion depth factor.

Figure 9:
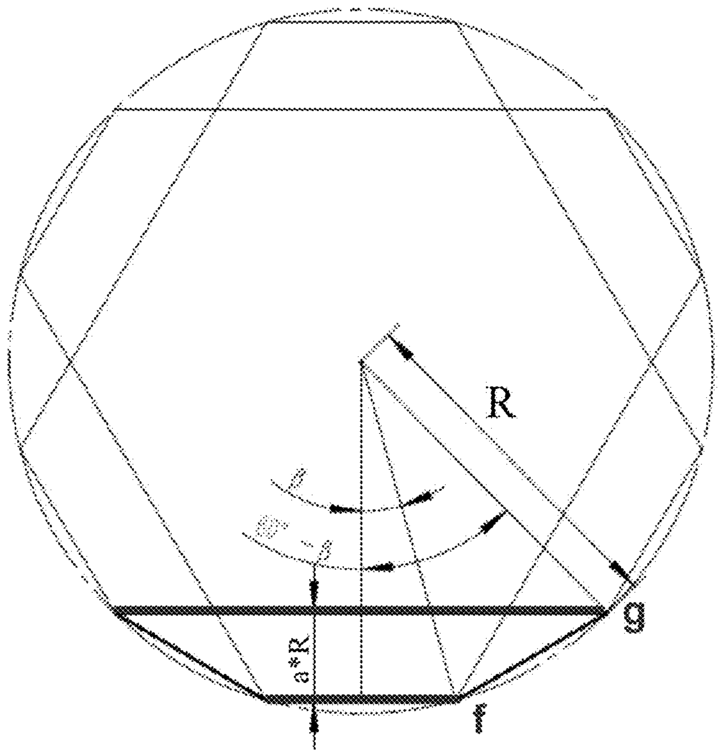
FIG. 9 shows a geometrically resolved view of the creases of two adjacent layers of the soft muscle of FIG. 1.

Referring to FIG. 9, in some embodiments, the central axis of one of the two adjacent layers of the hexagon and the central axis of the other layer enclose an angle of 60°.

In some embodiments, the central angle β of the short sides of the hexagon is configured to satisfy the following equation: a=cos β−cos(60°−β).

Figure 19:
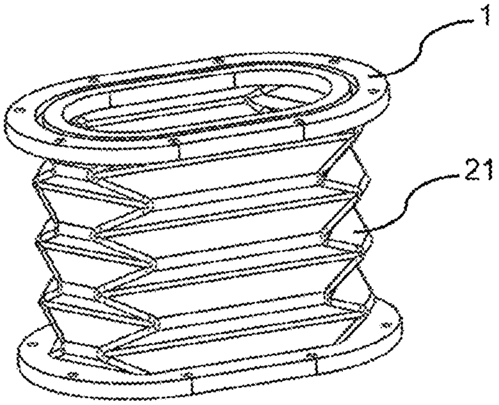
FIG. 19 shows a schematic view of a soft muscle according to some embodiments of the disclosure with a racetrack-like crease.
Figure 20:
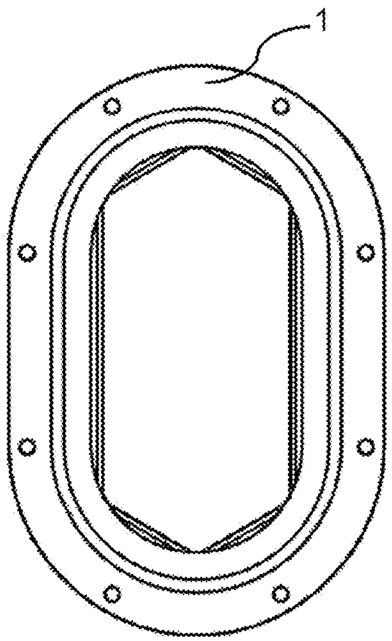
FIG. 20 shows a top view of a soft muscle of FIG. 19 with a racetrack-like crease.

Referring to FIGS. 19 and 20, in some embodiments, the polygon comprises a racetrack-shaped hexagon (two opposite and parallel sides in the hexagon are stretched).

The actual meaning of the defined intrusion depth factor a is described in detail below with reference to FIGS. 3 and 9 and with the soft muscle having hexagonal creases as an example. It can be seen from FIG. 3 that the crease f, the crease g and the corresponding folding face constitute the plane fg shown by the thick solid line. The distance from the crease f to the central axis is referred to as d1, and the distance from the crease g to the central axis is referred to as d2, and a=(d1−d2)/R. Referring to FIG. 9, the hexagonal crease corresponding to the crease f has a radius R1 of the minimum circumscribed circle, and half of the central angle corresponding to side f is defined as β. The hexagonal crease corresponding to the crease g has a radius R2 of the minimum circumscribed circle, and half of the central angle corresponding to side g is defined as β1. From the geometrical relationship, it can be deduced that d1=R1*cos β, d2=R2*cos β1, a=(R1*cos β−R2*cos β1)/R. Further, in the embodiment with hexagonal creases, since R1=R2=R and β1=60°−β, it can be deduced that a=cos β−cos(60°−β). The value of a reflects the inclination of the plane fg. The greater the value of a is, the greater the angle between the plane fg and the central axis, i.e. the greater the intrusion depth. The smaller the value of a is, the smaller the angle between the plane fg and the central axis, i.e. the smaller the intrusion depth.

As can be seen from the above, there is the geometric relationship as below: tan θ=h/a*R, wherein h is the distance between two adjacent crease planes in the initial state. Further, H=M*h, tan θ=H/(M*R*cos β cos(60°−β)), through which the constraint relationship among M, R, H, β and θ can be established.

In some embodiments, the figures formed by two adjacent layers of creases have different radii of minimum circumscribed circle. In particular, in this embodiment, the radius of the soft muscle is defined as the average value of two radii of minimum circumscribed circle.

Still taking the soft muscle with hexagonal creases as an example, referring to FIG. 9, if it is desired that the soft muscle works in an environment of one standard atmospheric pressure and the force output by the end face 1 is Fm, then the soft muscle satisfies Fm=Fe+M*Fi, where Fe is the resultant force exerted on the soft muscle by the differential pressure between the inside and outside of the cavity, and this resultant force is in the direction of the central axis of the cavity, and FI is the internal stress generated by a single layer of the strain uniformly-distributed stacking structure during the deformation process of the soft muscle. Fm=(P−0.1 Mpa)*Sc+M*Fi, wherein P is the pressure inside the cavity, 0.1 MPa is one atmospheric pressure, and Sc is the equivalent area of the soft muscle, which is equal to the sum of the areas of the two end surfaces 1 plus the areas of the projections of the plurality of folding faces 21 on a plane parallel to the end surfaces 1. Referring to FIG. 9, this figure shows a sectional schematic view of a soft muscle with hexagonal creases in top view. The trapezoid enclosed by the thick solid line in the figure is the equivalent area of a folding face 21 of a single layer of the strain uniformly-distributed stacking structure. Through simulation and experimental verification, it is known that if the soft muscle satisfies the characteristics of small strain, there is an area factor $C_1$ between Sc and the radius R of the soft muscle. This area factor $C_1$ is related to the intrusion depth factor a and half of the central angle β of the short side. That is, $Sc=2\Pi R^2+M*C*R^2$, and $C_1=(\sin\beta+\sin(60°-\beta))(\cos\beta-\cos(60°-\beta))$, wherein the range of the value a is predetermined, that is, the value of a is between 0.2 and 0.5. Through the formula $a=(\cos\beta-\cos(60°-\beta))$, the angular range of β can be calculated, that is, β is between 0° and 18°. The area factor $C_1$ can also be obtained therefrom, $0.2<C_1<0.5$. Furthermore, the end face output force Fm forms a linear relationship with the differential pressure between the inside and outside of the cavity.

Further, since a is between 0.2 and 0.5, β is between 0 and 18° correspondingly. The smaller the angle of β, the shorter the short side of the hexagon, and the closer the shape of the crease to a triangle. The greater the angle of β, the longer the short side of the hexagon, and the closer the shape of the crease to a hexagon. During the folding deformation of the soft muscle, in case of a small value of β, an overlapping interference between the individual folding faces 21 will occur at the short sides in the crease, reducing the working stability of the soft muscle. Therefore, in some embodiments, the wall thickness t of the flexible sidewall 2 is further configured to satisfy the following equation: $t<(R*\sin\beta)/3$, wherein β is half of the central angle corresponding to the short sides of a polygon. Subject to the design concepts of θ, t, R and a described above, in some embodiments, the shapes of the polygons enclosed by the creases 21 may be arbitrary, and the angles between the central axes of the polygons on the different crease planes may also be configured arbitrarily as well. Further, the polygons formed by the creases of the adjacent layers can be configured to have the same shape but different size in proportional relationships.

As mentioned above, the second type of the soft muscle is the soft muscle with curved creases. In some embodiments, multiple creases formed at the joint of the respective folding faces 21 of two adjacent layers of the strain uniformly-distributed stacking structure are sequentially connected in the circumferential direction to form a closed curve, and the intrusion depth factor a of the soft muscle is configured to satisfy the following equation: $0.2<a<0.4$. Advantageously, in relation to the crease characteristics of the soft muscle, better folding deformation performance of the soft muscle can be unexpectedly obtained by setting an advantageous range of intrusion depth factor.

In some embodiments, referring to FIG. 12, for any three consecutive creased surfaces P4 to P6 in the multilayered crease planes of the soft muscle with curved creases, the contour of the projection of the creases on the crease plane P4 onto the crease plane P5 does not intersect with the contour of the creases on the crease plane P5 itself. That is to say, the closed curve enclosed by the creases corresponding to the crease plane P5 contains the closed curve enclosed by the creases corresponding to the crease plane P4 within it.

In some embodiments, the closed curve enclosed by the creases corresponding to the crease plane P4 overlaps the closed curve enclosed by the creases corresponding to the crease plane P6. In some other embodiments, the closed curve enclosed by the creases corresponding to the crease plane P4 does not overlap the closed curve enclosed by the creases corresponding to the crease plane P6.

Figure 11:
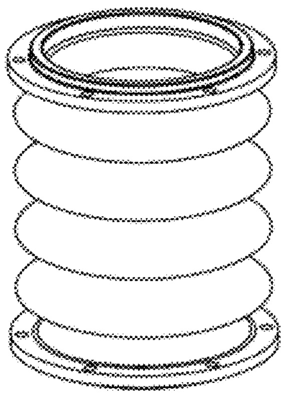
FIG. 11 shows a schematic view of a soft muscle according to some more embodiments of the disclosure with circular creases.

Referring to FIGS. 11 and 12, in some embodiments, the shape of the creases is circular.

In addition, when the soft muscle is mounted and used in an arm joint, its arrangement on the cross-section of the arm joint has a great impact on the working efficiency of the arm joint. For example, in order to provide a high load-to-weight ratio and load-to-volume ratio with a compact structure, it is a preferable selection to configure the cross-section of the arm joint to be close to a circle. For the distribution of the soft muscles on the cross-section of the arm joint, the arrangement of connectors such as hinges, of the fluid passages, the sensors, and the like needs to be taken into account. Among the basic types of arm joints that make up a manipulator, rotary arm joints may have a large area share of rotational drive elements arranged in the center of the cross-section, telescopic arm joints may have a multi-stage folding/telescopic guiding support arranged in the center of the cross-section, and bending arm joints may have the soft muscle itself and the hinge deviate from their original positions laterally in the bending state. Thus, in order to avoid interference and ensure the stable and reliable operation of the system, it is necessary to leave a redundancy larger than the space occupied by the hinge body around the hinge. Therefore, the design of soft muscles with non-circular cross-section that are more adaptable to the various working conditions and compactly arranged in the arm joints is essential for optimizing the load-to-weight ratio and load-to-volume ratio of the manipulator.

Further, a plurality of soft muscles are uniformly arranged around the center of the cross-section of the arm joint. By controlling different telescopic amounts of the plurality of soft muscles, the bending of the arm joint in multiple directions can be realized, and the working applicability of the arm joint can be improved. For example, referring to FIG. 28, three elliptical soft muscles are spaced apart in the cross-section of an arm joint, which can be made to bend in different directions by controlling the telescopic amount of the three soft muscles. In case of the fixed cross-sectional area of the arm joint, the fewer the soft muscles distributed on the arm joint, the smaller the percentage of the flexible sidewalls 2, and the more efficient the fluid drive is.

Figure 15:
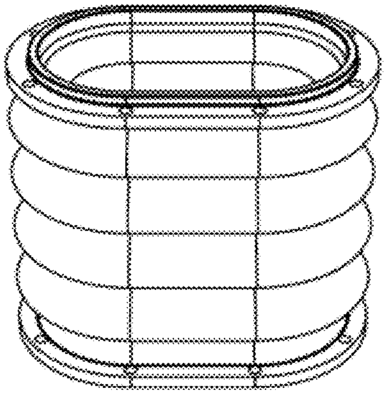
FIG. 15 shows a schematic view of a soft muscle according to some embodiments of the disclosure.
Figure 21:
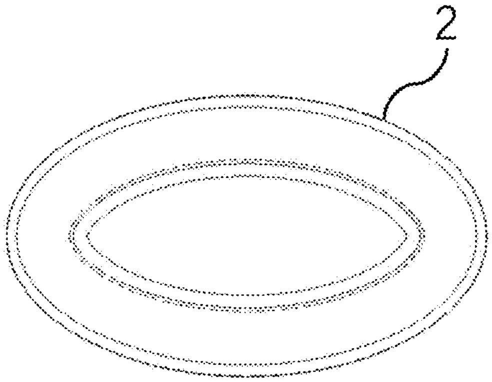
FIG. 21 shows a schematic view of a crease of an elliptical soft muscle according to some embodiments of the disclosure.
Figure 28:
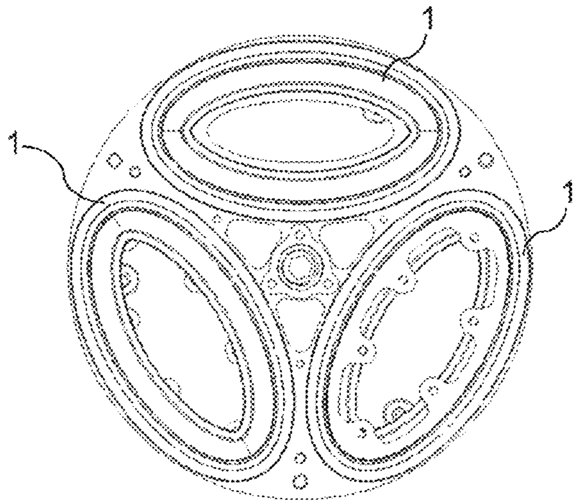
FIG. 28 shows a schematic view of an arm joint consisting of three elliptical soft muscles according to some embodiments of the disclosure.

Thus, on the basis of ensuring that the arm joint can bend in multiple directions, in order to utilize the near-circular cross-section of the arm joint as much as possible, referring to FIGS. 15, 21 and 28, in some embodiments, the shape of the crease is elliptical or racetrack-shaped (that is, compared with circular soft muscles, fewer elliptical or racetrack-shaped soft muscles can fully cover the cross-section of the arm joint). That is, the closed curve comprises an ellipse or a racetrack shape. In the direction of a short axis of the ellipse or the racetrack shape, the folding faces 21 have a maximum distance d1 and a minimum distance d2 from the central axis. At this time, the intrusion depth factor a of the soft muscle, the maximum distance d1 and the minimum distance d2 are configured to satisfy the following equation: a=(d1−d2)/R, wherein R is the radius of the soft muscle and R=d1.

Figure 22:
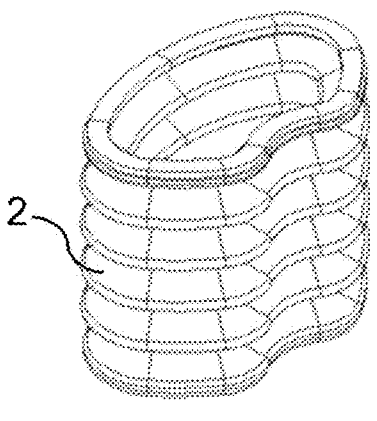
FIG. 22 shows a schematic view of a fan-ring-like soft muscle according to some embodiments of the disclosure.
Figure 23:
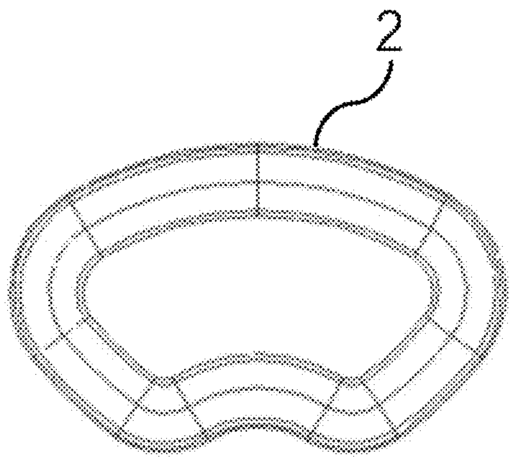
FIG. 23 shows a top view of the soft muscle of FIG. 22.

By the same token, in order to utilize the near-circular cross-section of the arm joint as much as possible, referring to FIGS. 22 and 23, in some embodiments, the creases have a fan-ring shape. That is, the closed curve comprises a fan-ring shape. In the radial direction of the fan-ring shape, the folding faces 21 have a maximum distance d1 from the central axis, the difference between the maximum distance and the minimum distance of the folding faces 21 from the central axis is d2, the intrusion depth factor a is configured to satisfy the following equation: a=(d1−d2)/R, wherein R is the radius of the soft muscle and R=d1.

In order to reduce the stress concentration, in some embodiments, the fan-ring shape has transition arc at four corners, and the radius $r_0$ of the transition arc of the outer contour of the fan-ring shape satisfies: $r_0 \geq R*(1-a)$.

Figure 24:
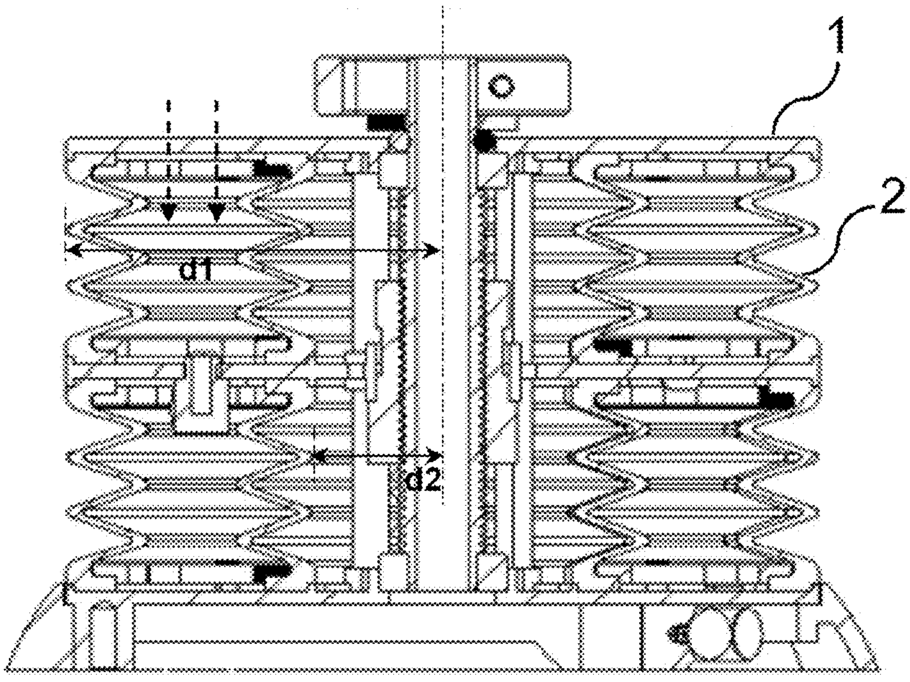
FIG. 24 shows a sectional view of an annular muscle according to some embodiments of the disclosure.

Referring to FIG. 24, in some embodiments, the flexible sidewall 2 comprises an inner sidewall and an outer sidewall surrounding an outer side of the inner sidewall, wherein the inner sidewall and the outer sidewall are coaxially disposed. The inner sidewall and the outer sidewall form an annular region that is configured as cavity for allowing fluid to flow in and out (for the convenience of description, this kind of soft muscle is referred to as an annular muscle). Different from the soft muscles in the above embodiments, the creases of the annular muscle in this embodiment are in the annular shape. The soft muscle is driven to expand and contract by injecting or extracting fluid between the inner sidewall and the outer sidewall (that is, the area indicated by the dotted arrow in FIG. 24).

In some embodiments, the annular shape comprises a circular ring-shape. The parameters of the inner sidewall and the outer sidewall of the annular muscle can be designed respectively with reference to the flexible sidewall 2 of the soft muscle with circular creases. In other words, the initial intrusion angle θp of the outer sidewall of the annular muscle may be different from that of the inner sidewall.

Still referring to FIG. 24, in some other embodiments, the plurality of crease planes of the inner sidewall of the annular muscle are respectively provided in correspondence with and coplanar with the plurality of creases planes of the outer sidewall. The folding faces 21 of the outer sidewall have a maximum distance d1 from the central axis, and the folding faces 21 of the inner sidewall have a minimum distance d2 from the central axis. The intrusion depth factor a of the annular muscle is configured to satisfy the following equation: a=(d1−d2)/R, wherein R is the radius of the soft muscle and R=d1.

In some embodiments, the distance between two adjacent layers in the multilayered crease planes of the inner sidewall is the same as the distance between two adjacent layers in the multilayered crease planes of the outer sidewall.

Still referring to FIG. 24, the difference between the maximum distance and the minimum distance from the folding faces 21 of the outer sidewall or inner sidewall to the central axis is defined as intrusion depth value. In order to optimize the volume and work efficiency of the annular muscle, in some embodiments, for the intrusion depth value of the outer sidewall and the intrusion depth value of the inner sidewall, the intrusion depth factor of the outer sidewall is smaller than the intrusion depth factor of the inner sidewall (because the intrusion depth values of the two are equal and because the radius of the soft muscle corresponding to the outer sidewall is larger than the inner sidewall, the intrusion depth factor a of the outer sidewall is smaller that the inner sidewall).

In some embodiments, the maximum intrusion angle θmax of the soft muscle is configured to satisfy the following equation: 27°<θ max<42°.

In order to make the soft muscle conform to the characteristics of small strain, in some embodiments, during compression or extension of the strain uniformly-distributed stacking structure, the area change rate $\sigma_\Delta$ of the folding faces 21 of the soft muscle satisfies the following equation: $0.001<\sigma_\Delta<0.03$, wherein the area change rate $\sigma_\Delta=2a(1-\cos\theta)/(2-a)$.

Figure 29:
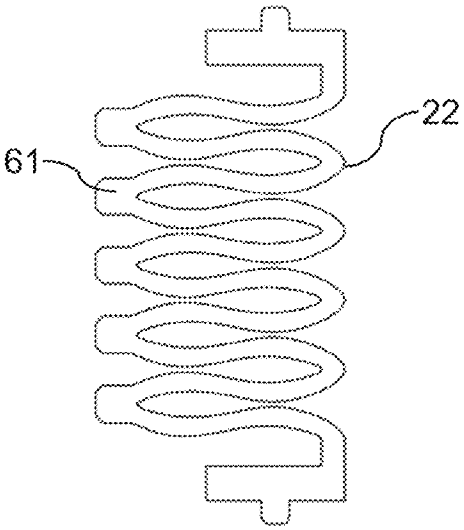
FIG. 29 shows a schematic view of a soft muscle according to some embodiments of the disclosure, with an s-shaped-bent folding face after a great degree of folding.

In particular, referring to FIG. 1, taking an origami-type muscle as an example, in the process of stretching and contracting of the soft muscle, in addition to the hexagonal crease on the crease plane, there is also an inclined crease connecting two adjacent crease planes. For example, in FIG. 1, the folding face 21 is an isosceles trapezoid, and the short and long sides of the isosceles trapezoid are located in two adjacent crease planes respectively and each form one of the sides of a hexagonal crease in the respective crease plane. The waist of the isosceles trapezoid then constitutes an inclined crease, so that the inclined crease actually bends during folding of the soft muscle. The inclined creases are more difficult to bend when folding the origami muscle designed according to the technical solution of this disclosure than the folding face. In order to optimize the force bearing, the angle between the inclined creases and the working direction (i.e., the direction of the axis of the soft muscle) is controlled. By establishing the proportional relationship between the initial intrusion angle θp of a single piece of trapezoidal folded face and the lengths of each side of the trapezoid, since the long and short sides of the trapezoid on the same layer enclose a complete crease, there is a correlation between the ratio of the long and short sides, the central angle (referring to FIG. 9, the central angle corresponding to the long-side crease g or the central angle corresponding to the short-side crease f), the intrusion angle θ and the distance h between two adjacent crease planes. Through the equation $\sigma_\Delta=2a(1-\cos\theta)/(2-a)$ and the value range of σΔ, the combination of values such as the shape of a single trapezoid, the initial angle, and the thickness of the folding face 21 is controlled, so as to obtain a folding face (referring to FIG. 29) that is prone to s-shaped uniform strain under the specified working conditions (differential pressure range and the corresponding stroke range).

In some embodiments, by limiting the range of the difference of the change in the area of the folding face 21 during deformation of the soft muscle, the performance of the soft muscle can be further optimized, and a soft muscle that can simultaneously satisfy the requirements such as a large thrust-to-weight ratio, a large compression ratio, a high energy-efficiency, and a long lifespan can be obtained. Referring to FIGS. 11 and 12, taking the corrugated soft muscle as an example, through the simplification process, the folding face of the corrugated folding muscle in the initial state is regarded as the side of a circular table, its upper and lower bases have diameters r and R, respectively, and the length of the generatrix is L=(R−r)/cos γ. If the folding face 21 in the folded state is regarded as a circular ring with the inner and outer diameters of R-L and R, respectively, there is a $\sigma_k$=a(1−cos γ)/(2 cos γ−a). Through this equation, the value range of θmax or θp can be limited by the range of values of σk for soft muscles under different working conditions, ensuring that the sidewalls are still under small strains when the soft muscle elongation is maximized within the set working stroke. The area difference factor of the folding faces is defined as $\sigma_k$=a(1−cos γ)/(2 cos γ−a), wherein σk is the ratio of the area change value of the folding faces when the soft muscle is deformed from the first state to the second state (the first and second state refer to two arbitrary states in the range of the deformation of the soft muscle but not specifically refer to a certain state) to the area of the folding faces in the first state, γ is the changed value of the intrusion angle θ when the soft muscle is deformed from the first state to the second state. When the soft muscle has an operating differential pressure in the range of −0.08 to 0 Mpa (only the negative pressure is used, the load it bears is relatively small, at this time, during the working process of the soft muscle, the maximum angle is θp, that is to say, the soft muscle can only be compressed), the value of the initial intrusion angle θp is defined by the formula $\sigma_k$=a(1−cos γ)/(2 cos γ−a), wherein γ=θp, and when 0.4<a<0.55, 0.02<$\sigma_k$<0.185. Preferably, 0.05<$\sigma_k$<0.125, and in this embodiment, the flexible sidewall 2 is made of materials satisfying: tensile strength is greater than 5 Mpa, Shore hardness is greater than 60, resilience is greater than 50%.

Correspondingly, when the soft muscle has an operating differential pressure in the range of −0.08 to 2 Mpa (both negative and positive pressure are applicable, with a large differential pressure span, enabling it to bear a greater load; at this time, during the working process of the soft muscle, the maximum angle is θmax, that is to say, the soft muscle can be both compressed and extended), the value of the initial intrusion angle θp is defined by the formula $\sigma_k$=a(1−cos γ)/(2 cos γ−a), wherein γ=θp, 0.01<$\sigma_k$<0.1; preferably, 0.025<<0.08, or 0.03<<$\sigma_k$<0.06, and the value of the maximum intrusion angle θmax is defined by the formula $\sigma_{k1}$=a (1−cos γ)/(2 cos γ−a), wherein γ=θmax, 0.03<$\sigma_{k1}$<0.12, and $\sigma_{k1}$ also satisfies 1.05$\sigma_k$<$\sigma_{k1}$<2.2$\sigma_k$. In this embodiment, the flexible sidewall 2 is made of materials satisfying: tensile strength is greater than 9 Mpa, Shore hardness is greater than 70, resilience is greater than 40%, and further, tensile strength is greater than 12 Mpa, Shore hardness is greater than 80, resilience is greater than 30%.

When defining the values of θp and θmax, it is advantageous that $\sigma_k$ and $\sigma_{k1}$ satisfy: 0.05<$\sigma_{k1}$<0.8, and 1.1$\sigma_k$<$\sigma_{k1}$<1.7$\sigma_k$. Further, 0.2<a<0.8, or 0.25<a<0.5, or 0.3<a<0.45.

Through the above-mentioned method, the change of the intrusion angle of the soft muscle within the range of 0° to θp is constrained (i.e., γ=θp), and the value of θp is limited. Also, the change of the intrusion angle within the range of 0° to θmax is constrained (i.e., γ=θmax), and the value of θmax is limited. Furthermore, considering the change of the intrusion angle of the soft muscle within the range of θp to θmax, by limiting the relationship between $\sigma_k$ and $\sigma_{k1}$, the performance of the soft muscle is further guaranteed.

With reference to the above calculation of the output force of the end face of the soft muscle with hexagonal creases, the soft muscle with the curved creases still meets the formula Fm=(P−0.1 Mpa)*Sc+M*Fi and Sc=2ΠR$^2$+M*C*R$^2$. For the soft muscle with circular creases, the calculation of its area factor $C_2$ is different from the aforesaid calculations. In particular, $C_2$=Π*cos θ(2a−a$^2$). The value range of $C_2$ can be attained based on the value range of a and θ, and further, the output force Fm of the end face has a linear relationship with the differential pressure between the inside and outside of the cavity.

Referring to FIG. 3, in some embodiments, the soft muscle further comprises a connecting portion 4. The connecting portion 4 is arranged on the end face 1 of the soft muscle, and the axial dimension t1 and the radial dimension t2 of the connecting portion 4 are configured to satisfy the following equation: t<t1<6t, a*R<t2<1.5a*R. In particular, the shape of the connecting portion 4 is adapted to the shape of the end face 1. The connecting portion 4 is used for improving the force-bearing stability of the end face 1 of the soft muscle, reducing the risk of axial, radial and circumferential deformation at the end of the soft muscle during deformation. In some embodiments, the connecting portion 4 is integrally formed on the end face 1 of the soft muscle.

Figure 10:
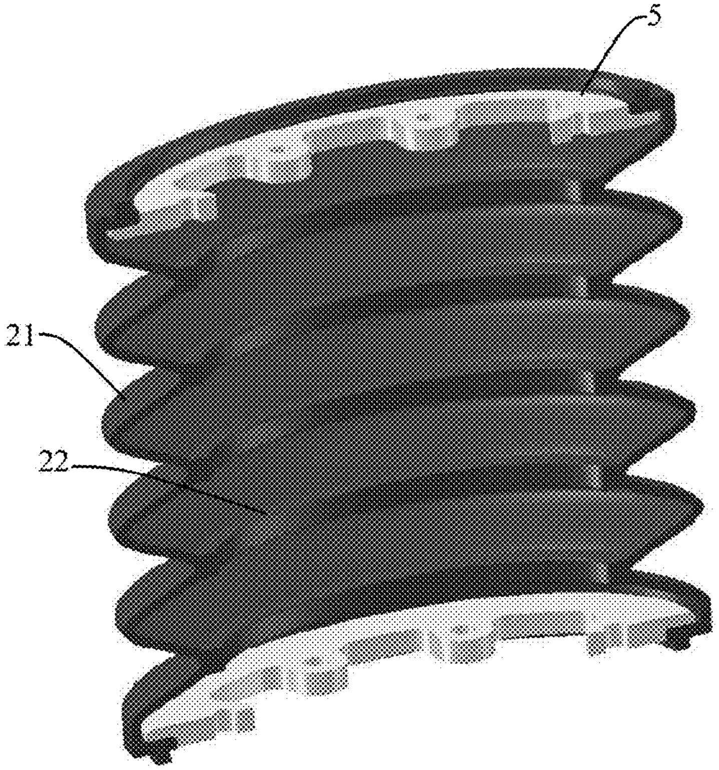
FIG. 10 shows a schematic view of a section of a soft muscle according to some other embodiments of the disclosure with elliptical creases and a support member.

Referring to FIG. 10, in some embodiments, the soft muscle further comprises a support member 5 disposed in the cavity of the soft muscle near the end face 1. The support member 5 has a shape adapted to the shape of the connecting portion 4. One of the support member 5 and the connecting portion 4 has a first positioning portion, and the other one has a form-fit second positioning portion. The first positioning portion and the second positioning portion form a concave-convex fit and have a maximum dimension t3 in at least one of the axial and radial directions, which is configured to satisfy the following equation: 2t<t3. In particular, the support 5 is used to enhance the air tightness of the cavity of the soft muscle and improve the structural stability of the end face 1 of the soft muscle. By providing a concave-convex fit positioning portion between the support member 5 and the connecting portion 4, the structural stability of the soft muscle and the air tightness in the cavity can be further enhanced.

In some embodiments, the support member is in a plate-like or a sheet-like structure made of a material having a higher Young's modulus or hardness. In particular, the support member 5 is made of a material having a Young's modulus greater than 1 Gpa.

In some embodiments, the cross-sectional shape of the first positioning portion and the second positioning portion comprises any one of convex shape, L-shape, n-shape and few-zigzag shape.

Figure 27:
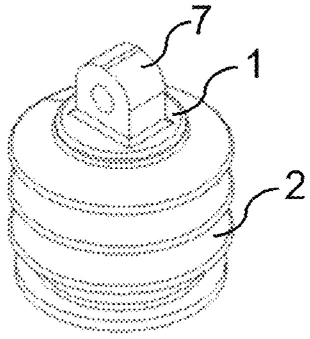
FIG. 27 shows a schematic view of a lug-type soft muscle according to some embodiments of the disclosure.

Referring to FIG. 27, in some embodiments, the soft muscle further comprises a hooking portion 7. The hooking portion 7 is arranged on the end face 1. The hooking portion 7 is used for mating with a mating member in the working environment to hook the soft muscle on the mating member. In particular, the hooking portion 7 may have a throughhole through which the mating member passes, thereby hooking the soft muscle on the mating member. The soft muscle having a hooking portion 7 can be used as lug-type soft muscle, and the lug-type soft muscle is easy to hang on the mating member to work, expanding the applicable working scenarios.

In some embodiments, the hooking portion 7 has a slot and the mating member has a shape that is fit for the shape of the slot, facilitating the hooking portion to form a hooking engagement with the mating member.

In order to provide the soft muscle with a good folding property, in some embodiments, the layer number M of the multilayered strain uniformly-distributed stacking structure satisfies the following equation: 8<M<12. In particular, considering the diversity of the soft muscle operation environment in designing the soft muscle, if the working space meets the value range of H/R, it can be directly determined that the number of muscle layers meets 8 to 12. If the working space does not meet the value range of H/R, the working space can be divided into a combination of multiple space units that meet the value range of H/R, and the number of muscle layers corresponding to each space unit is then determined.

Figure 17:
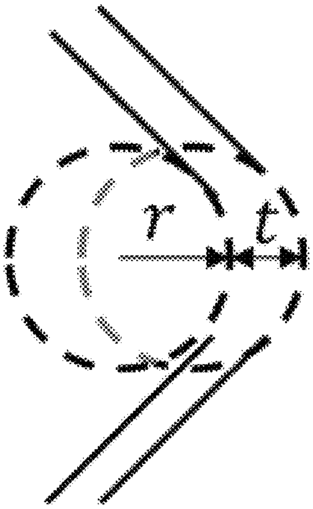
FIG. 17 shows a schematic view of a chamfer at a crease of a soft muscle according to some embodiments of the disclosure.

Referring to FIG. 17, in some embodiments, the folding faces 21 of two adjacent layers of the strain uniformly-distributed stacking structure are provided with chamfers at the positions where they are joined by the creases 22. In particular, the arrangement of chamfer can reduce the stress concentration at the crease 22 during the folding deformation of the soft muscle, thereby improving the service life of the soft muscle.

In some embodiments, the chamfer has a radius r, and the radius r of the chamfer and the wall thickness t of the flexible sidewall satisfy the following equation: r<0.5t.

In some embodiments, the soft muscle further comprises reinforcing ribs arranged in the cavity and located at the creases 22 recessed towards the cavity. The radial size t4 and the axial size t5 of the reinforcing ribs are configured to satisfy the following equation: t5<t4<10t, t<t5<2t, wherein t is the wall thickness of the flexible sidewall 2. The reinforcing ribs are used to improve the lateral rigidity of the soft muscle.

Figure 25:
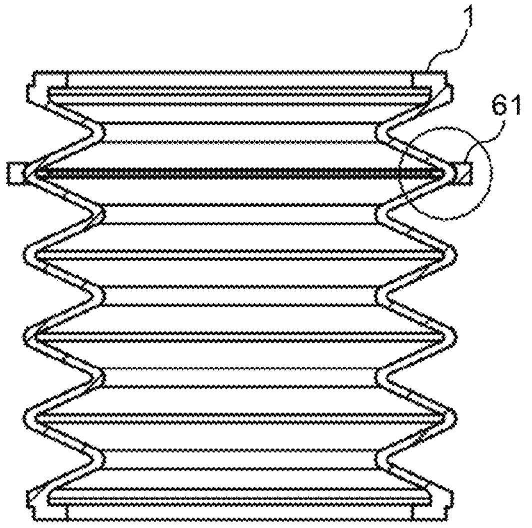
FIG. 25 shows a schematic view of a soft muscle according to some embodiments of the disclosure, with a crease shaping member provided at the crease.
Figure 26:
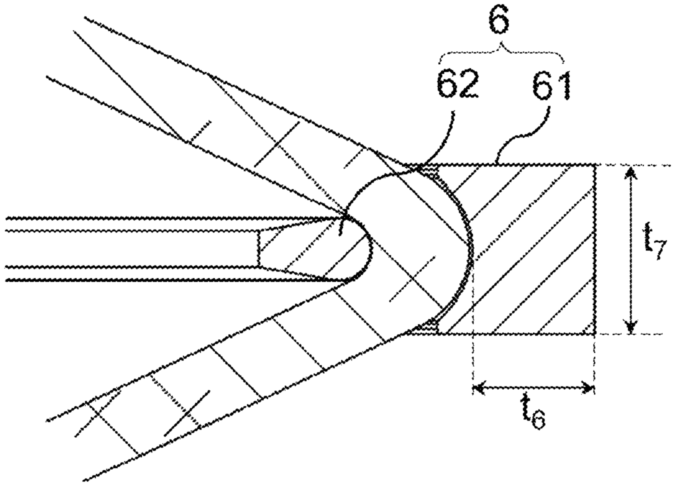
FIG. 26 shows an enlarged view of a section of FIG. 25.

Referring to FIGS. 25 and 26, in some embodiments, the soft muscle further comprises a crease shaping member. The crease shaping member is arranged at the creases protruding outwards. The crease shaping member is used for limiting the crease in the axial direction, thereby reducing the strain degree of the crease position during the telescopic process of the soft muscle and improving the service life of the soft muscle.

In some embodiments, the crease shaping member comprises an outer crease shaping member located outside the cavity. In particular, the outer crease shaping member has a shape that matches the outer contour of the crease, so that the outer crease shaping member fits well with the crease which improves the reinforcement effect. Of course, the outer crease shaping member can also be integrally formed with the flexible sidewall 2. In some embodiments, the crease shaping member comprises an inner crease shaping member located inside the cavity. The inner crease shaping member has a shape that matches the inner contour of the crease, so that the inner crease shaping member fits well with the crease, which improves the reinforcement effect.

Referring to FIG. 6, in some embodiments, the central axis of the cavity of the soft muscle has a curvature of 0 and the distance between the respective crease planes is the same. That is, the crease planes of each layer are vertical to the central axis of the cavity. In other words, the soft muscle can drive the target object to move in a straight line along the central axis.

Figure 16:
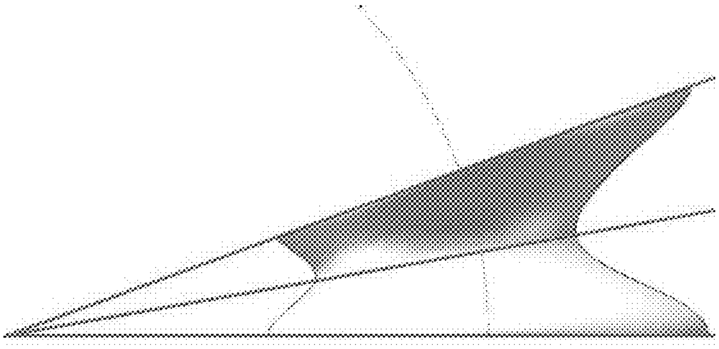
FIG. 16 shows a schematic view of a section of a soft muscle according to some embodiments of the disclosure with the central axis in the form of an arc.

Referring to FIG. 16, in some embodiments, the central axis of the cavity of the soft muscle has a curvature greater than 0 and the angle between the respective crease planes is the same. The soft muscle can drive the target object to move in an arc along the central axis.

In some embodiments, the folding face 21 of at least one layer of the strain uniformly-distributed stacking structure has a predetermined curved profile that exhibits a trigonometric or spline curve orientation. Referring to the plane fg (i.e. the folding face) represented by the thick line in FIG. 3, in some embodiments, at least partial folding faces in the soft muscle is configured as a curved surface similar to the trigonometric or spline curve orientation rather than the plane fg as shown in FIG. 3, so as to improve the strain uniformly-distributed characteristics of the soft muscle.

In some embodiments, during compression or extension of the strain uniformly-distributed stacking structure, the folding face 21 of the strain uniformly-distributed stacking structure has a uniform strain distribution. In particular, the difference in strain is no more than 10% per $10^2$ mm area.

Figure 4:
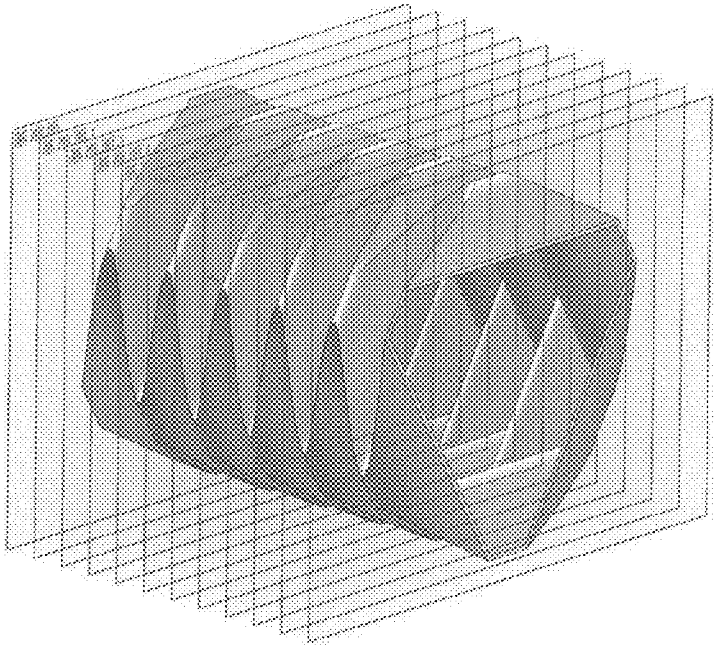
FIG. 4 shows a schematic view of a flexible sidewall of the soft muscle of FIG. 1.
Figure 5:
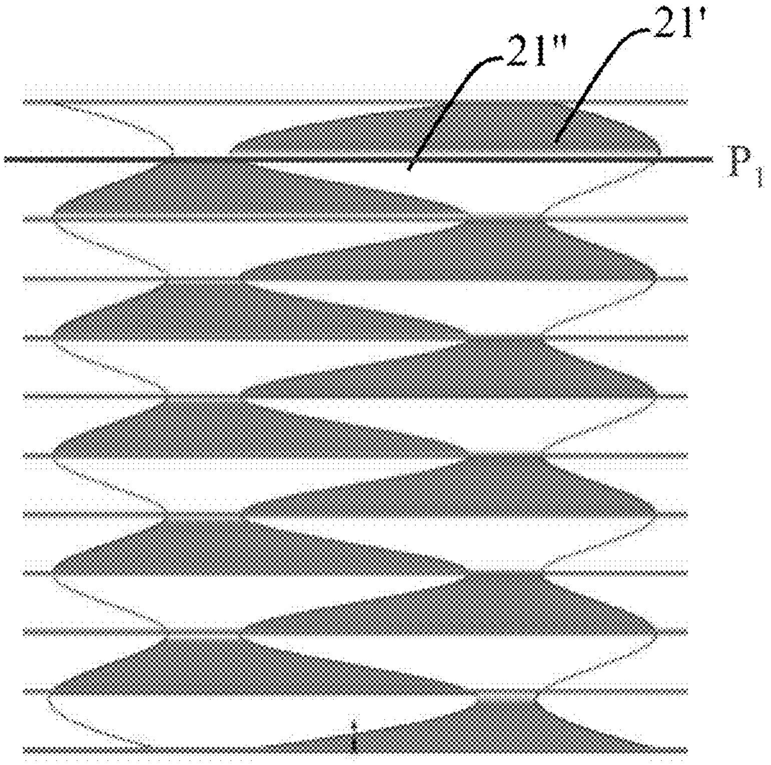
FIG. 5 shows a schematic plane view of the flexible sidewall of the soft muscle of FIG. 1.

Referring to FIGS. 1, 4 and 5, in some embodiments, the two folding faces 21 on both sides of the crease plane are of the same shape and are symmetrical about this crease plane. In particular, the folding faces 21' and 21" have the same shape and are isosceles trapezoidal, and the folding faces 21' and 21" are symmetrical about the crease plane P1.

In order to ensure a good folding deformation performance of the soft muscle, in some embodiments, the soft muscle is made of materials satisfying: tensile strength is greater than 9 Mpa, Shore hardness is greater than 80, resilience is greater than 30% (under the ISO 4662-2017 test standard). Being made of a material with high resilience, the soft muscle is enabled to store, during the reciprocating motion of deformation, the part of the fluid energy for overcoming the internal stress of the strain uniformly-distributed stacking structure in a relatively large proportion in the material in the form of elastic potential energy, and then convert it back into mechanical energy for the rebound and reset of the strain uniformly-distributed stacking structure in the subsequent process, thereby improving the energy transfer efficiency.

In some embodiments, the soft muscle is made of thermoplastic polyurethane elastomer rubber (TPU).

In some other embodiments, the soft muscle is configured to be composed of any one or more of silicone rubber, polyethylene, polypropylene, and TPU.

Figure 18:
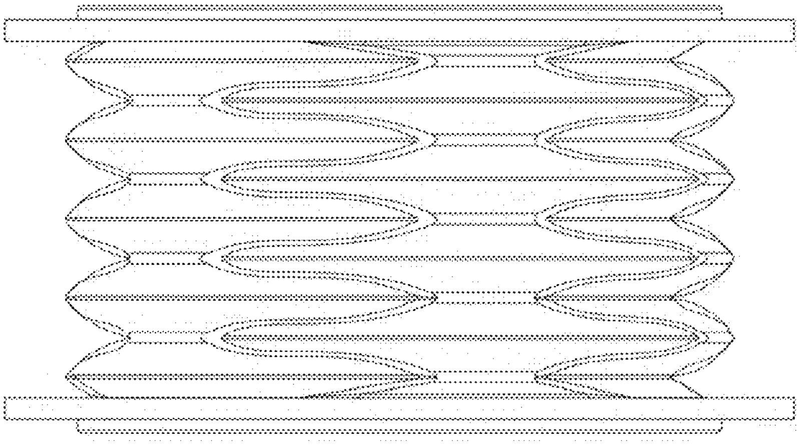
FIG. 18 shows a schematic view of a soft muscle according to some embodiments of the disclosure, which is bent on a folding face after a great degree of compression.

In some preferable embodiments, the soft muscle with polygonal creases simultaneously satisfies the following relationships:

$$15° \le \theta\text{max} \le 45°;$$

$$0.6\theta\text{max} < \theta p < 0.8\theta\text{max};$$

$$10° < \theta p < 30°;$$

$$0.05H/\sin\theta p << 0.2h/\sin\theta p, \text{ and } t < (R*\sin\beta)/3;$$

$$R < t/2;$$

and when the polygon is a quadrilateral, 0.2<a<0.8; when the polygon is a hexagon, 0.2<a<0.5, wherein tan θ=h/(R*a). As for this type of preferable embodiment, the folding faces 21 will bend after the soft muscle is compressed to a large extent (in particular see FIG. 18), which indicates that this type of soft muscle has a stronger strain uniformly-distributed performance than other types, and thus has a longer service life with more than 3 million times of folding service life of the soft muscle.

In some preferable embodiments, the soft muscle with curved creases simultaneously satisfies the following relationships:

$$27° \le \theta\text{max} \le 42°;$$

$$0.6\theta\text{max} < \theta p < 0.8\theta\text{max};$$

$$10° < \theta p < 30°;$$

$$0.2 < a < 0.4;$$

$0.001<\sigma_\Delta<0.03$, wherein the area change rate $\sigma_\Delta=2a(1-\cos\theta)/(2-a)$; and/or $$R < t/2.$$

This disclosure further provides a soft muscle, comprising two end faces 1, a flexible sidewall 2 and a drive source port 3. The flexible sidewall 2 and the two end faces 1 enclose a cylindrical cavity having a central axis. The flexible sidewall 2 is designed to or comprises a multilayered strain uniformly-distributed stacking structure. The strain uniformly-distributed stacking structure therein comprises a first layer of strain uniformly-distributed stacking structure and a second layer of strain uniformly-distributed stacking structure with folding faces 21 and sequentially adjacent to each other, and a first crease plane with at least one crease 22 is formed between the first layer of strain uniformly-distributed stacking structure and the second layer of strain uniformly-distributed stacking structure. The axially adjacent folding faces 21 of the first layer of strain uniformly-distributed stacking structure and the second layer of strain uniformly-distributed stacking structure are configured to be symmetrically arranged about the first crease plane, and the angle between the respective folding face 21 and the first crease plane is defined as intrusion angle θ. The folding faces 21 have a maximum distance d1 from the central axis. The folding faces 21 have a minimum distance d2 from the central axis. The soft muscle has an intrusion depth factor a. The intrusion depth factor a, the maximum distance d1 and the minimum distance d2 are configured to satisfy the following equation: a=(d1−d2)/R, wherein R is the radius of the soft muscle. The maximum distance d1 and the minimum distance d2 are configured such that the intrusion depth factor a satisfies 0.2<a<0.8. The drive source port 3 is arranged on the flexible sidewall 2 or on the end face 1. The drive source port 3 is used to move fluid in and out of the cavity to change the differential pressure between inside and outside of the cavity and to enable the strain uniformly-distributed stacking structure to compress or extend so as to drive the end face 1 of the soft muscle to move. The soft muscle therein has an initial intrusion angle θp in an initial state, which varies from 0° to a maximum intrusion angle θmax during the compression or extension of the strain uniformly-distributed stacking structure. The initial intrusion angle θp and the maximum intrusion angle θmax of the soft muscle therein are configured to satisfy the following equation: 0.6θmax<θp<0.8θmax, and 15°≤θ max≤45°.

In some embodiments, the strain uniformly-distributed stacking structure comprises a third layer of strain uniformly-distributed stacking structure with folding faces 21 adjacent to the second layer of strain uniformly-distributed stacking structure. Between the second layer of strain uniformly-distributed stacking structure and the third layer of strain uniformly-distributed stacking structure, a second crease plane with at least one crease 22 is formed. The folding face 21 of the second layer of strain uniformly-distributed stacking structure and the axially adjacent folding face 21 of the third layer of strain uniformly-distributed stacking structure are configured to be symmetrically arranged about the second crease plane.

In some embodiments, the central axis of the cavity of the soft muscle is configured as a straight line and the distance between the first and second crease planes is a fixed value.

In some embodiments, the central axis of the cavity of the soft muscle is configured as an arc and the angle between the first and second crease planes is a fixed value.

In some embodiments, in the initial state, the distance between the first crease plane and the second crease plane is h, and the thickness of the flexible sidewall 2 is t. The distance h, the wall thickness t and the initial intrusion angle θp are configured to satisfy the following equation: 0.05 h/sin θp<<0.2 h/sin θp.

In some embodiments, the wall thickness t of the flexible sidewall 2 is further configured to satisfy the following equation: t<(R*sin β)/3, wherein β is half of the central angle corresponding to the short sides of a polygon.

Figure 30:
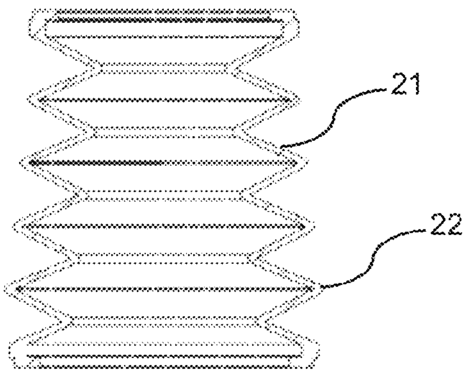
FIG. 30 shows a schematic view of a tapering soft muscle according to some embodiments of the disclosure.
Figure 31:
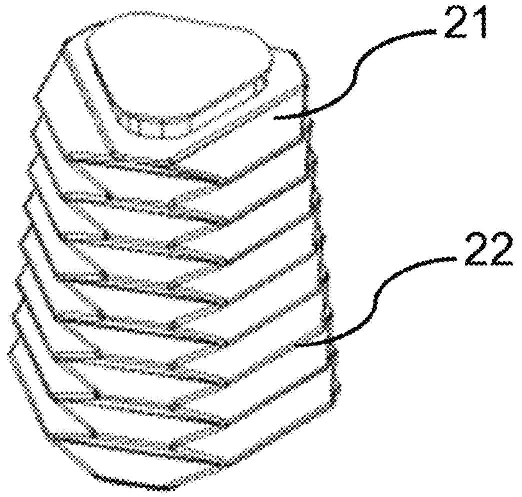
FIG. 31 shows a schematic view of a tapering soft muscle according to some further embodiments of the disclosure.

In some embodiments, the size of the contour of the crease on the crease plane gradually varies in the axial direction of the soft muscle. For example, referring to FIG. 30, the difference from the corrugated muscle is that the sectional area of the cavity is gradually reduced from the bottom to the top of the soft muscle. FIG. 31 is a schematic view of a triangular origami muscle, with creases shaped the same from the bottom to the top of the soft muscle, but reduced in proportion.

In summary, various types of soft muscles obtained through the methods of the embodiments of this disclosure can realize that during the process of folding deformation, large-scale deformations such as depressions or protrusions do not occur on the folding faces. The driving force of the flow is mainly used to make the strain uniformly-distributed stacking structure fold or stretch. The flexible sidewall itself hardly undergoes any strain (i.e., the aforementioned characteristic of small strain), and the creases do not deform either. This enables the soft muscle to maintain a stable basic shape (a cylindrical shape with a length changing along the axis) with the creases as the framework. The crease planes uniformly approach and move away from each other along the axis. The creases within the crease planes do not bend or deform, nor do they move within the crease planes but only move along the axis with the crease planes. As the distance between the crease planes changes, the sidewall changes the angle of inclination relative to the crease planes between the crease planes, while the basic position and shape of the sidewall itself (the basic position is determined by the creases) remain unchanged. A single folding face may undergo a slight s-shaped bending (refer to FIG. 29), but there will be no obvious area change caused by tensile strain.

This disclosure further provides a transmission structure. The transmission structure comprises an end plate and at least two above-mentioned soft muscles arranged side by side. The end plate is arranged on two ends of the at least two soft muscles. The central axes of the at least two soft muscles are parallel to one another. In the initial state, the end plates at the same end are in the same plane and the end plates are fixedly connected to the soft muscle. In particular, the fluid in the individual soft muscle can be controlled independently, i.e. the telescopic state of the soft muscle can be different to achieve the bending function.

In some embodiments, the transmission structure further comprises a communication member. The communication member may be a passageway. The passageway is connected to the soft muscle in the driving manner. The passageway may be a closed channel (separating liquid, gas and solids from the surrounding space) for making the soft muscles drive the passageway to move, so as to move the working objects passing through the passageway (such as dust, air, etc.). Of course, the passageway can also be a conductor (insulated from the surrounding environment) through which the current passes.

This disclosure further provides a transmission structure. The transmission structure comprises a push plate, an end plate and an even number of above-mentioned soft muscles axially arranged. The central axes of the soft muscles are collinear. The push plate is arranged between two soft muscles arranged axially. The end plate is arranged on the other end of the two soft muscles axially arranged, which is away from the push plate. The end plate is fixedly connected to the soft muscle. The push plate is provided with a screw, through which a bolt passes.

In some embodiments, the transmission structure further comprises a communication member. The communication member may be a passageway. The passageway is connected to the soft muscle in the driving manner. The passageway may be a closed channel (separating liquid, gas and solids from the surrounding space) for making the soft muscles drive the passageway to move, so as to move the working objects passing through the passageway (such as dust, air, etc.). Of course, the passageway can also be a conductor (insulated from the surrounding environment) through which the current passes.

In some embodiments, the transmission structure further comprises a connector. In particular, the transmission structure includes two end plates that are arranged at two end faces of a plurality of soft muscles, respectively. The connector is connected between the two end plates, so that when the soft muscles are deformed, they drive the two end plates through the connector to make a relative movement with a high degree of freedom.

In some embodiments, the connector is a telescopic rod or guide rail. In this case, the transmission structure is used as telescopic arm joint.

In some embodiments, the connector is a hinge. In this case, the transmission structure is used as bent arm joint.

In some embodiments, the connector is a one-way hinge. In this case, the transmission structure is used as one-way bent arm joint.

In some embodiments, the connector is a universal hinge. In this case, the transmission structure is used as omnidirectional bent arm joint.

This disclosure provides a robot comprising a soft muscle or transmission structure as described above. For a telescopic, bent and rotary transmission structure, the compression ratio of the soft muscle is an important factor affecting the transmission performance (amplitude ratio of telescoping, angle of bending, angle of rotation). Through the robot provided by this disclosure, stable and precise control of the target output force of the manipulator can be achieved, and the robot has a highly efficient energy output and a long service life.

Figure 32:
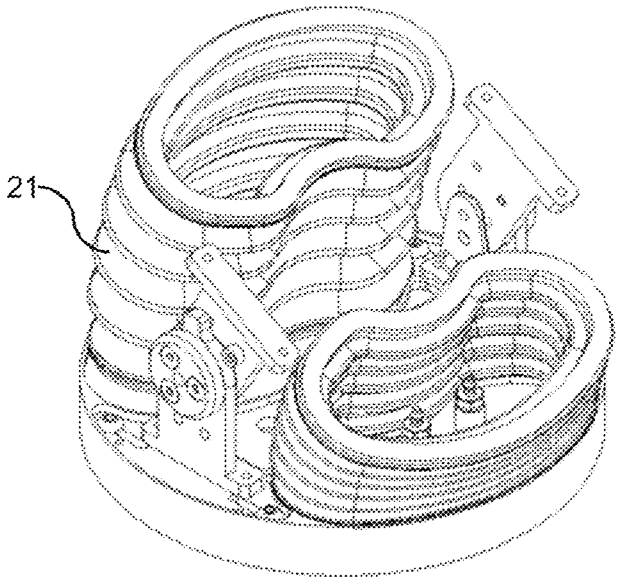
FIG. 32 shows a schematic view of a one-way bending arm joint consisting of two elliptical soft muscles according to some embodiments of the disclosure.

In particular, referring to FIG. 32, this robot includes an end plate and two fan-ring-shaped soft muscles symmetrically distributed on the end plate. In the figure, the soft muscle on the left hand is in the extended state and the one on the right hand is in the compressed state, so that the robot is bent to the right (i.e. it can be used as one-way bent arm joint). The performance of the soft muscle directly determines the performance of the robot.

This disclosure also provides a method of producing a soft muscle, including the steps of:

S1, providing a casting mould;

S2, liquefying and casting a preparation material into the mould; and

S3, heating the mould to form the above-mentioned soft muscle.

In some embodiments, in step S3, the heating of mould includes heating the mould to a temperature higher than 180° C.

In some embodiments, the method of producing a soft muscle further includes the step of: S4, spraying a polymeric material coating on an outer side of the soft muscle after the soft muscle is formed. In particular, the coating spraying can further prolong the service life and facilitate recycling.

In some embodiments, the polymeric material coating is configured to be the same as the material from which the soft muscle is prepared.

In some embodiments, the polymeric material coating is configured to have at least partially the same composition as the material from which the soft muscle is prepared.

In some embodiments, the soft muscle is formed by blow molding technology.

This disclosure further provides a method of designing a manipulator, including the steps of:

obtaining a working requirement and selecting the above-mentioned transmission structure as an arm joint based on the working requirement;

obtaining an ambient pressure and a work load based on the working requirement and obtaining a workspace and a work stroke based on the transmission structure of the selected arm joint; and selecting, based on the soft muscle as described above, a type of the soft muscle and

What is claimed:

1. A soft muscle, comprising two end faces (1), a flexible sidewall (2) and a drive source port (3), the flexible sidewall (2) and the two end faces (1) enclosing to form a cylindrical cavity having a central axis, the flexible sidewall (2) being configured to or comprising a strain uniformly-distributed stacking structure, which is formed by stacking strain uniformly-distributed stacking layers of identical shapes so that the strain of the entire sidewall is distributed uniformly across the individual strain uniformly-distributed stacking layers, the strain uniformly-distributed stacking layers comprising at least one strain unit with a folding face (21) and a crease (22), based on a combination of the shape, thickness and stacking manner of the strain units, the strain of the individual strain unit being uniformly distributed on the folding face (21) instead of being concentrated at the crease (22), the drive source port (3) being provided on the flexible sidewall (2) or on the end face (1) and being configured to change the differential pressure between inside and outside of the cavity and to cause the strain uniformly-distributed stacking structure to compress or extend to drive the end face (1) of the soft muscle to move;

wherein the strain uniformly-distributed stacking layer is enclosed by a single or a plurality of folding faces (21), at the joint of the folding faces (21) of two adjacent layers of the strain uniformly-distributed stacking structure, a crease plane with at least one crease (22) is formed, wherein the soft muscle has an intrusion angle θ, an intrusion depth factor a and a wall thickness t, the intrusion angle θ is the angle between two adjacent layers of the folding faces (21) and the crease plane, the intrusion angle θ varies with the compression or extension of the strain uniformly-distributed stacking structure, and a difference between distances from a convex crease and a concave crease on a strain unit to a central axis is defined as degree of depression, the intrusion depth factor a is the proportion of the degree of depression to the overall size of the convex crease, and the wall thickness t is a thickness of the flexible sidewall (2);

wherein the intrusion angle θ, the intrusion depth factor a and the wall thickness t are numerically related to each other and have predefined combinations of values, such that during the deformation of the soft muscle, only folding or unfolding of the strain uniformly-distributed stacking structure occurs on the flexible sidewall (2), and the strain of the flexible sidewall (2) is uniformly distributed on each of the folding faces (21) and not concentrated at the creases;

wherein the folding faces (21) and creases (22) have one or two basic shapes that are repeated or gradually change in proportion, the basic shapes are circumferentially distributed about the central axis to form a layer of the strain uniformly-distributed stacking layers, and the strain uniformly-distributed stacking layers extend along the central axis to form the strain uniformly-distributed stacking structure which is repetitively stacked in the axial direction, at the joint of the folding faces (21) of two adjacent layers of the strain uniformly-distributed stacking layers, a crease plane is formed, which has creases (22) having a contour in a form of a closed curve or a polygon, the creases on the spaced crease planes in the direction of the central axis have the same shape and the same position with respect to the central axis, the creases on the spaced crease planes and the creases on the adjacent crease planes have different concave and convex states on the flexible sidewall (2), the soft muscle has an initial intrusion angle θp in an initial state which varies from 0° to a maximum intrusion angle θmax during the compression or extension of the strain uniformly-distributed stacking structure, the crease (22) only moves along the axis with the crease plane without undergoing deformation;

wherein the soft muscle is configured to satisfy at least one of:

wherein the initial intrusion angle θp and the maximum intrusion angle θmax of the soft muscle are configured to satisfy: 0.6θmax<θp<0.8θmax, and 15°≤θmax≤45°;

wherein the maximum intrusion angle θmax of the soft muscle is configured to satisfy: 27°<θ max<42°; and wherein in the initial state, the distance between two adjacent layers in the multilayered crease planes is h, and the wall thickness of the flexible sidewall (2) is t, wherein the distance h, the wall thickness t, and the initial intrusion angle θp are configured to satisfy the following equation: 0.05 h/sin θp<t<0.2 h/sin θp.

2. The soft muscle according to claim 1, wherein the crease (22) formed at the joint of the respective folding faces (21) of the two adjacent strain uniformly-distributed stacking layers forms a closed curve in the circumferential direction, which comprises a circle, the area difference factor of the folding faces (21) is $\sigma_k$=a(1−cos γ)/(2 cos γ−a), wherein $\sigma_k$ is the ratio of the area change value of the folding faces (21) when the soft muscle is deformed from the first state to the second state to the area of the folding faces (21) in the first state, γ is the changed value of the intrusion angle θ when the soft muscle is deformed from the first state to the second state, the soft muscle is configured to satisfy at least one of:

wherein when the soft muscle has an operating differential pressure in the range of −0.08 to 0 Mpa, the value of the initial intrusion angle θp is defined by the formula $\sigma_k$=a(1−cos γ)/(2 cos γ−a), wherein γ=θp, and when 0.4<a<0.55, 0.02<$\sigma_k$<0.185;

wherein when the soft muscle has an operating differential pressure in the range of −0.08 to 0 Mpa, 0.05<$\sigma_k$<0.125;

wherein the flexible sidewall (2) is made of materials satisfying: tensile strength is greater than 5 Mpa, Shore hardness is greater than 60, resilience is greater than 50%;

wherein when the soft muscle has an operating differential pressure in the range of −0.08 to 2 Mpa, the value of the initial intrusion angle θp is defined by the formula $\sigma_k$=a(1−cos γ)/(2 cos γ−a), wherein γ=θp, 0.01<$\sigma_k$<0.1, and the value of the maximum intrusion angle θmax is defined by the formula $\sigma_{k1}$=a(1−cos γ)/(2 cos γ−a), wherein γ=θmax, 0.03<$\sigma_{k1}$<0.12, and Oki also satisfies 1.05$\sigma_k$<$\sigma_{k1}$<2.2 $\sigma_k$;

wherein 0.025<$\sigma_k$<0.08;

wherein 0.05<$\sigma_{k1}$<0.8, and 1.1$\sigma_k$<$\sigma_{k1}$<1.7σk;

wherein 0.2<a<0.8;

wherein the flexible sidewall (2) is made of materials satisfying: tensile strength is greater than 9 Mpa, Shore hardness is greater than 70, resilience is greater than 40%; and wherein the flexible sidewall (2) is made of materials satisfying: tensile strength is greater than 12 Mpa, Shore hardness is greater than 80, resilience is greater than 30%.

3. The soft muscle according to claim 1, wherein the crease (22) formed at the joint of the respective folding faces (21) of the two adjacent strain uniformly-distributed stacking layers forms a closed curve in the circumferential direction, which comprises an ellipse or a racetrack shape, in the direction of a short axis of the ellipse or the racetrack shape, the folding faces (21) have a maximum distance d1 and a minimum distance d2 from the central axis, the soft muscle has an intrusion depth factor a, the soft muscle is configured to satisfy at least one of:

wherein the intrusion depth factor a, the maximum distance d1 and the minimum distance d2 are configured to satisfy: a=(d1−d2)/R, wherein R is the radius of the soft muscle and R=d1;

wherein the area difference factor of the folding faces (21) is $\sigma_k$=a(1−cos γ)/(2 cos γ−a), wherein $\sigma_k$ is the ratio of the area change value of the folding faces (21) when the soft muscle is deformed from the first state to the second state to the area of the folding faces (21) in the first state, γ is the changed value of the intrusion angle θ when the soft muscle is deformed from the first state to the second state, and when the soft muscle has an operating differential pressure in the range of −0.08 to 0 Mpa, the value of the initial intrusion angle θp is defined by the formula $\sigma_k$=a(1−cos γ)/(2 cos γ−a), wherein γ=θp, and when 0.4<a<0.55, 0.02<σk<0.185;

wherein when the soft muscle has an operating differential pressure in the range of −0.08 to 0 Mpa, 0.05<σk<0.125;

wherein the flexible sidewall (2) is made of materials satisfying: tensile strength is greater than 5 Mpa, Shore hardness is greater than 60, resilience is greater than 50%;

wherein when the soft muscle has an operating differential pressure in the range of −0.08 to 2 Mpa, the value of the initial intrusion angle θp is defined by the formula σk=a(1−cos γ)/(2 cos γ−a), wherein γ=θp, 0.01<σk<0.1, and the value of the maximum intrusion angle θmax is defined by the formula $\sigma_k$1=a(1−cos γ)/(2 cos γ−a), wherein γ=θmax, 0.03<$\sigma_k$1<0.12, and σk1 also satisfies 1.05σk<$\sigma_k$1<2.2$\sigma_k$;

wherein $0.025<\sigma_k<0.08$;

wherein $0.05<\sigma_k 1<0.8$, and $1.1\sigma_k<\sigma_k 1<1.7\sigma_k$;

wherein $0.2<a<0.8$;

wherein the flexible sidewall (2) is made of materials satisfying: tensile strength is greater than 9 Mpa, Shore hardness is greater than 70, resilience is greater than 40%; and wherein the flexible sidewall (2) is made of materials satisfying: tensile strength is greater than 12 Mpa, Shore hardness is greater than 80, resilience is greater than 30%.

4. The soft muscle according to claim 1, wherein the crease (22) formed at the joint of the respective folding faces (21) of the two adjacent strain uniformly-distributed stacking layers forms a closed curve in the circumferential direction, which comprises a fan-ring shape, in the radial direction of the fan-ring shape, the folding faces (21) have a maximum distance d1 from the central axis, the difference between the maximum distance and the minimum distance of the folding faces (21) from the central axis is d2, the soft muscle is configured to satisfy at least one of:

wherein the intrusion depth factor a is configured to satisfy: a=(d1−d2)/R, wherein R is the radius of the soft muscle and R=d1;

wherein the fan-ring shape has transition arc at four corners, and the radius r0 of the transition arc of the outer contour of the fan-ring shape satisfies: r0≥R*(1−a);

wherein the area difference factor of the folding faces (21) is $\sigma_k=a(1-\cos\gamma)/(2\cos\gamma-a)$, wherein σk is the ratio of the area change value of the folding faces (21) when the soft muscle is deformed from the first state to the second state to the area of the folding faces (21) in the first state, γ is the changed value of the intrusion angle θ when the soft muscle is deformed from the first state to the second state, and when the soft muscle has an operating differential pressure in the range of −0.08 to 0 Mpa, the value of the initial intrusion angle θp is defined by the formula $\sigma_k=a(1-\cos\gamma)/(2\cos\gamma-a)$, wherein γ=θp, and when 0.4<a<0.55, 0.02<σk<0.185;

wherein when the soft muscle has an operating differential pressure in the range of −0.08 to 0 Mpa, $0.05<\sigma_k<0.125$;

wherein the flexible sidewall (2) is made of materials satisfying: tensile strength is greater than 5 Mpa, Shore hardness is greater than 60, resilience is greater than 50%;

wherein when the soft muscle has an operating differential pressure in the range of −0.08 to 2 Mpa, the value of the initial intrusion angle θp is defined by the formula $\sigma_k=a(1-\cos\gamma)/(2\cos\gamma-a)$, wherein γ=θp, $0.01<\sigma_k<0.1$, and the value of the maximum intrusion angle θmax is defined by the formula $\sigma_k 1=a(1-\cos\gamma)/(2\cos\gamma-a)$, wherein γ=θmax, $0.03<\sigma_k 1<0.12$, and σk1 also satisfies $1.05\sigma_k<\sigma_k 1<2.2\sigma_k$;

wherein $0.025<\sigma_k<0.08$;

wherein $0.05<\sigma_k 1<0.8$, and $1.1\sigma_k<\sigma_k 1<1.7\sigma_k$;

wherein $0.2<a<0.8$;

wherein the flexible sidewall (2) is made of materials satisfying: tensile strength is greater than 9 Mpa, Shore hardness is greater than 70, resilience is greater than 40%; and wherein the flexible sidewall (2) is made of materials satisfying: tensile strength is greater than 12 Mpa, Shore hardness is greater than 80, resilience is greater than 30%.

5. The soft muscle according to claim 1, wherein the flexible sidewall (2) comprises an inner sidewall and an outer sidewall surrounding the outer side of the inner sidewall, the soft muscle is configured to satisfy at least one of:

wherein the inner sidewall and the outer sidewall being coaxially disposed and forming an annular region that is configured as cavity for allowing fluid to flow in and out;

wherein the inner sidewall and the outer sidewall have different initial intrusion angle θp;

wherein the distance between two adjacent layers in the multilayered crease planes of the inner sidewall is the same as the distance between two adjacent layers in the multilayered crease planes of the outer sidewall;

wherein the annular shape comprises a circular ring-shape, the plurality of crease planes of the inner sidewall are respectively provided in correspondence with and coplanar with the plurality of creases planes of the outer sidewall, the folding faces (21) of the outer sidewall have a maximum distance d1 from the central axis and the folding faces (21) of the outer sidewall have a minimum distance d2 from the central axis, the soft muscle has an intrusion depth factor a that is configured to satisfy: a=(d1−d2)/R, wherein R is the radius of the soft muscle and R=d1;

wherein the area difference factor of the folding faces (21) is $\sigma_k=a(1-\cos\gamma)/(2\cos\gamma-a)$, wherein $\sigma_k$ is the ratio of the area change value of the folding faces (21) when the soft muscle is deformed from the first state to the second state to the area of the folding faces (21) in the first state, γ is the changed value of the intrusion angle θ when the soft muscle is deformed from the first state to the second state, and when the soft muscle has an operating differential pressure in the range of −0.08 to 0 Mpa, the value of the initial intrusion angle θp is defined by the formula $\sigma_k=a(1-\cos\gamma)/(2\cos\gamma-a)$, wherein γ=θp, and when 0.4<a<0.55, 0.02<σk<0.185;

wherein when the soft muscle has an operating differential pressure in the range of −0.08 to 0 Mpa, $0.05<\sigma_k<0.125$;

wherein the flexible sidewall (2) is made of materials satisfying: tensile strength is greater than 5 Mpa, Shore hardness is greater than 60, resilience is greater than 50%;

wherein when the soft muscle has an operating differential pressure in the range of −0.08 to 2 Mpa, the value of the initial intrusion angle θp is defined by the formula $\sigma_k=a(1-\cos\gamma)/(2\cos\gamma-a)$, wherein γ=θp, 0.01<σk<0.1, and the value of the maximum intrusion angle θmax is defined by the formula $\sigma_k 1=a(1-\cos\gamma)/(2\cos\gamma-a)$, wherein γ=θmax, $0.03<\sigma_k 1<0.12$, and $\sigma_k 1$ also satisfies $1.05\sigma_k<\sigma_k 1<2.2\sigma_k$;

wherein $0.025<\sigma_k<0.08$;

wherein $0.05<\sigma_k 1<0.8$, and $1.1\sigma_k<\sigma_k 1<1.7\sigma_k$;

wherein $0.2<a<0.8$;

wherein the flexible sidewall (2) is made of materials satisfying: tensile strength is greater than 9 Mpa, Shore hardness is greater than 70, resilience is greater than 40%; and wherein the flexible sidewall (2) is made of materials satisfying: tensile strength is greater than 12 Mpa, Shore hardness is greater than 80, resilience is greater than 30%.

6. The soft muscle according to claim 1, wherein the soft muscle further comprises a connecting portion (4) arranged on the end face (1) of the soft muscle, the soft muscle is configured to satisfy at least one of:

wherein an axial dimension t1 and a radial dimension t2 of the connecting portion (4) being configured to satisfy: $t<t1<6t$, $a*R<t2<1.5a*R$, wherein t is the wall thickness of the flexible sidewall (2), and the soft muscle has a radius R;

wherein the connecting portion (4) is integrally formed on the end face (1) of the soft muscle;

wherein the soft muscle further comprises a support member (5) disposed in the cavity of the soft muscle near the end face (1), the support member (5) having a shape adapted to the shape of the connecting portion (4), one of the support member (5) and the connecting portion (4) having a first positioning portion, and the other one having a form-fit second positioning portion, the first positioning portion and the second positioning portion forming a concave-convex fit and having a maximum dimension t3 in at least one of the axial and radial directions, which is configured to satisfy: $2t<t3$;

wherein the soft muscle further comprises a hooking portion (7) that is arranged on the end face (1) and is used for mating with a mating member in the operation environment to hook the soft muscle on the mating member;

wherein the soft muscle has an initial height H in the initial state and a radius R, which are configured to satisfy: $H/R<4$;

wherein the initial height H and the radius R of the soft muscle are configured to satisfy: $0.6<H/R<3$;

wherein the folding faces (21) of two adjacent strain uniformly-distributed stacking layers are provided with chamfers at the positions where they are joined by the creases (22);

wherein the chamfer has a radius r, the radius r of the chamfer and the wall thickness t of the flexible sidewall (2) satisfying: $r<0.5t$;

wherein the inner side of the folding faces (21) has a radius r1 at the chamfer, the outer side of the folding faces (21) has a radius r2 at the chamfer, the folding faces (21) have a thickness t0, and the chamfer satisfies: r1≤t0, r1+0.510≤r2≤3t0;

wherein the chamfer satisfies: 0.110≤r1≤0.5t0;

wherein the soft muscle further comprises reinforcing ribs arranged in the cavity and at the creases (22) recessed towards the cavity, and the radial size t4 and the axial size t5 of the reinforcing ribs are configured to satisfy: $15<t4<10t$, $t<t5<2t$, wherein t is the wall thickness of the flexible sidewall (2);

wherein the soft muscle further comprises a crease shaping member (6) for limiting the shape of the crease (22) in the axial direction, the crease shaping member (6) being arranged at the creases (22) of the flexible sidewall (2) protruding outwards;

wherein the crease shaping member (6) includes an outer crease shaping member (61) located outside the convex side of the crease (22) of the flexible sidewall (2) and an inner crease shaping member (62) located inside the concave side of the crease (22) of the flexible sidewall (2), the outer crease shaping member (61) is fit to the outer contour of the crease (22), the inner crease shaping member (62) is fit to the inner contour of the crease (22), the outer crease shaping member (61) has a radial dimension t6 and an axial dimension t7 satisfying: 0.5t0≤t6≤3t0, 0.5t0≤t7≤2.5t0;

wherein the central axis of the cavity of the soft muscle has a curvature of 0 and the distance between the respective crease planes is the same;

wherein the central axis of the cavity of the soft muscle has a curvature greater than 0 and the angle between the respective crease planes is the same;

wherein the folding face (21) of at least one strain uniformly-distributed stacking layer has a predetermined curved profile that exhibits a trigonometric or spline curve orientation;

wherein during compression or extension of the strain uniformly-distributed stacking layers, the folding face (21) of the strain unit has a uniform strain distribution;

wherein the two folding faces (21) on both sides of the crease plane are of the same shape and are symmetrical about the crease plane; and wherein the soft muscle is made of materials satisfying: tensile strength is greater than 9 Mpa, Shore hardness is greater than 80, resilience is greater than 30%.

7. The soft muscle according to claim 1, wherein the soft muscle is configured to satisfy at least one of:

wherein the multilayered strain uniformly-distributed stacking layers include a third strain uniformly-distributed stacking layer with a folding face (21) adjacent to the second strain uniformly-distributed stacking layer, a second crease plane with at least one crease (22) is formed between the second strain uniformly-distributed stacking layer and the third strain uniformly-distributed stacking layer;

wherein the folding face (21) of the second strain uniformly-distributed stacking layer and the axially adjacent folding face (21) of the third strain uniformly-distributed stacking layer are configured to be arranged symmetrically about the second crease plane;

wherein the central axis of the cavity of the soft muscle is configured as a straight line and the distance between the first and second crease planes is a fixed value;

wherein the central axis of the cavity of the soft muscle is configured as an arc and the angle between the first and second crease planes is a fixed value;

wherein the distance between the first and second crease planes is h, and the wall thickness of the flexible sidewall (2) is t, wherein the distance h, the wall thickness t, and the initial intrusion angle θp are configured to satisfy: $0.05\ h/\sin\theta p<t<0.2\ h/\sin\theta p$; and wherein the wall thickness t of the flexible sidewall (2) is also configured to satisfy: $t<(R*\sin\beta)/3$, wherein β is half of the central angle corresponding to the short sides of a polygon.

8. A transmission structure, comprising an end plate and at least two soft muscles according to claim 1 arranged side by side, the end plates being provided at two ends of at least two of the soft muscles, the at least two soft muscles having parallel central axes, in the initial state, the end plates at the same end being in the same plane and the end plates being fixedly connected to the soft muscles; and/or further comprising a communication member.

9. A transmission structure, comprising a push plate, an end plate and an even number of soft muscles according to claim 1 axially arranged, central axes of the soft muscles are collinear, the push plate being provided between two of the axially arranged soft muscles, the end plate being provided at the other end of two of the axially arranged soft muscles away from the push plate, the end plate being fixedly connected to the soft muscles, the push plate having a screw through with a bolt passes; and/or further comprising a communication member.

10. A robot, comprising at least one soft muscle according to claim 1 or at least one transmission structure according to claim 8.

11. A method of producing a soft muscle, comprising the steps of:

providing a casting mould;

liquefying and casting a preparation material into the mould; and heating the mould to form a soft muscle according to claim 1.

12. A method of designing a manipulator, comprising the steps of:

obtaining a working requirement and selecting the transmission structures of claim 8 as an arm joint based on the working requirement;

obtaining an ambient pressure and a work load based on the working requirement and obtaining a workspace and a work stroke based on the transmission structure of the selected arm joint; and selecting, based on the soft muscle according to claim 1, a type of the soft muscle and determining an initial height H, a radius R, an intrusion depth factor a, an initial intrusion angle θp, a maximum intrusion angle θmax, and a wall thickness t of the flexible sidewall of the soft muscle based on a shape of a corresponding crease.

13. The soft muscle according to claim 1, wherein the folding faces (21) have a maximum distance d1 and a minimum distance d2 from the central axis, and the soft muscle has an intrusion depth factor a, and the intrusion depth factor a, the maximum distance d1 and the minimum distance d2 are configured to satisfy: a=(d1−d2)/R, wherein R is the radius of the soft muscle and is defined as the radius of the smallest circumscribed circle of the figure formed by sequentially joining one or more of the creases (22), the soft muscle is configured to satisfy at least one of:

wherein the maximum distance d1 and the minimum distance d2 are configured such that the intrusion depth factor a of the soft muscle is greater than 0.2;

wherein during compression or extension of the strain uniformly-distributed stacking layers, the area change rate $\sigma_\Delta$ of the folding faces (21) of the soft muscle satisfies: $0.001<\sigma_\Delta<0.03$, wherein the area change rate $\sigma_\Delta=2a(1-\cos\theta)/(2-a)$;

wherein the area difference factor of the folding faces (21) is $\sigma_k=a(1-\cos\gamma)/(2\cos\gamma-a)$, wherein $\sigma_k$ is the ratio of the area change value of the folding faces (21) when the soft muscle is deformed from the first state to the second state to the area of the folding faces (21) in the first state, γ is the changed value of the intrusion angle θ when the soft muscle is deformed from the first state to the second state, and when the soft muscle has an operating differential pressure in the range of −0.08 to 0 Mpa, the value of the initial intrusion angle θp is defined by the formula $\sigma_k=a(1-\cos\gamma)/(2\cos\gamma-a)$, wherein γ=θp, and when 0.4<a<0.55, $0.02<\sigma_k<0.185$;

wherein when the soft muscle has an operating differential pressure in the range of −0.08 to 0 Mpa, $0.05<\sigma_k<0.125$;

wherein the flexible sidewall (2) is made of materials satisfying: tensile strength is greater than 5 Mpa, Shore hardness is greater than 60, resilience is greater than 50%;

wherein when the soft muscle has an operating differential pressure in the range of −0.08 to 2 Mpa, the value of the initial intrusion angle θp is defined by the formula $\sigma_k=a(1-\cos\gamma)/(2\cos\gamma-a)$, wherein γ=θp, $0.01<\sigma_k<0.1$, and the value of the maximum intrusion angle θmax is defined by the formula $\sigma_k 1=a(1-\cos\gamma)/(2\cos\gamma-a)$, wherein γ=θmax, $0.03<\sigma_k 1<0.12$, and σk1 also satisfies $1.05\sigma_k<\sigma_k 1<2.2\sigma_k$;

wherein $0.025<\sigma_k<0.08$;

wherein $0.05<\sigma_k 1<0.8$, and $1.1\sigma k<\sigma_k 1<1.7\sigma k$;

wherein 0.2<a<0.8;

wherein the flexible sidewall (2) is made of materials satisfying: tensile strength is greater than 9 Mpa, Shore hardness is greater than 70, resilience is greater than 40%; and wherein the flexible sidewall (2) is made of materials satisfying: tensile strength is greater than 12 Mpa, Shore hardness is greater than 80, resilience is greater than 30%.

14. The soft muscle according to claim 6, wherein multiple creases (22) formed at the joint of the respective folding faces (21) of two adjacent strain uniformly-distributed stacking layers are sequentially joined in the circumferential direction to form a polygon, the soft muscle is configured to satisfy at least one of:

wherein in the initial state, the distances between two adjacent layers in the multilayered crease planes are the same and are all h;

wherein the wall thickness t of the flexible sidewall (2) is also configured to satisfy: t<(R*sin β)/3, wherein β is half of the central angle corresponding to the short sides of a polygon;

wherein a half of the creases (22) is of equal length and forms the long sides of the polygon, the other half of the creases (22) is of equal length and forms the short sides of the polygon; and wherein the ratio of the length of the long side of the polygon to the length of the short side of the polygon is set to be greater than 2.

15. The soft muscle according to claim 7, wherein the polygon includes a quadrilateral, the soft muscle is configured to satisfy at least one of:

wherein the intrusion depth factor a is configured to satisfy: 0.2<a<0.8; and wherein the central axis of one of two adjacent layers of the quadrilateral and the central axis of the other layer enclose an angle of 90°.

16. The soft muscle according to claim 7, wherein the polygon includes a hexagon, the soft muscle is configured to satisfy at least one of:

wherein the intrusion depth factor a is configured to satisfy: 0.2<a<0.5;

wherein the central axis of one of two adjacent layers of the hexagon and the central axis of the other layer enclose an angle of 60°; and wherein a half of the sides of the hexagon is of equal length and forms the long sides of the hexagon, the other half of the sides of the hexagon is of equal length and forms the short sides of the hexagon, and the central angle β of the short sides of the hexagon is configured to satisfy: a=cos β−cos(60°−β).

17. The soft muscle according to claim 6, wherein the creases (22) formed at the joint of the respective folding faces (21) of two adjacent layers of the strain uniformly-distributed stacking structure form a closed curve in the circumferential direction, and the intrusion depth factor a is configured to satisfy: 0.2<a<0.4.

18. The producing method of soft muscle according to claim 16, further comprising at least one of the step of: heating the mould including heating the mould to a temperature higher than 180° C.; and spraying a polymeric material coating on an outer side of the soft muscle after the soft muscle is formed.

* * * * *